United States Patent [19]

Yu et al.

[11] Patent Number: 4,760,523
[45] Date of Patent: Jul. 26, 1988

[54] FAST SEARCH PROCESSOR

[75] Inventors: Kwang-I Yu; Shi-Ping Hsu, both of Pasadena; Lee Z. Hasiuk; Peggy M. Otsubo, both of Redondo Beach, all of Calif.

[73] Assignee: TRW Inc., Redondo Beach, Calif.

[21] Appl. No.: 946,655

[22] Filed: Dec. 24, 1986

Related U.S. Application Data

[63] Continuation of Ser. No. 726,457, Apr. 24, 1985, abandoned, which is a continuation-in-part of Ser. No. 626,432, Jun. 29, 1984, abandoned.

[51] Int. Cl.⁴ .............................................. G06F 15/16
[52] U.S. Cl. .............................................. 364/200
[58] Field of Search ... 364/200 MS File, 900 MS File

[56] References Cited

U.S. PATENT DOCUMENTS

| | | | |
|---|---|---|---|
| 4,205,302 | 5/1980 | Godo | 340/146.2 |
| 4,433,392 | 2/1984 | Beaven | 364/900 |
| 4,450,520 | 5/1984 | Hollaar et al. | 364/200 |
| 4,490,811 | 12/1984 | Yianilos et al. | 364/900 |
| 4,531,201 | 7/1985 | Skinner, Jr. | 364/900 |
| 4,550,436 | 10/1985 | Freeman et al. | 382/34 |
| 4,625,295 | 11/1986 | Skinner | 364/900 |

*Primary Examiner*—Raulfe B. Zache
*Attorney, Agent, or Firm*—Noel F. Heal; Benjamin DeWitt

[57] ABSTRACT

A special-purpose search processor, and a related method, for performing a variety of logically complex searches of a serial data stream in a highly concurrent fashion. The processor comprises a sequence of serially connected cells of identical construction, and the data stream is passed through the sequence of cells, each cell performing a logical operation based only on the data provided to it from the previous cell in the sequence. Each cell has a character register for data storage and a pattern register for storage of part of a search pattern. The contents of the two registers are compared in each cell, at each cycle of a clock used to propagate the data through the processor. Match indicators or match tolerance values are propagated through the processor on a match line, and match results emerge in synchronism with the data stream. Multiple match lines are employed in one preferred embodiment, to temporarily save, retrieve and exchange match tolerance values, in order to effect logically complex searches in a highly concurrent manner. Types of searches that may be performed include logical OR and AND searches, common-prefix OR searches, and searches involving variable-length and fixed-length don't-care strings, variable-length care strings, and negate strings.

53 Claims, 11 Drawing Sheets

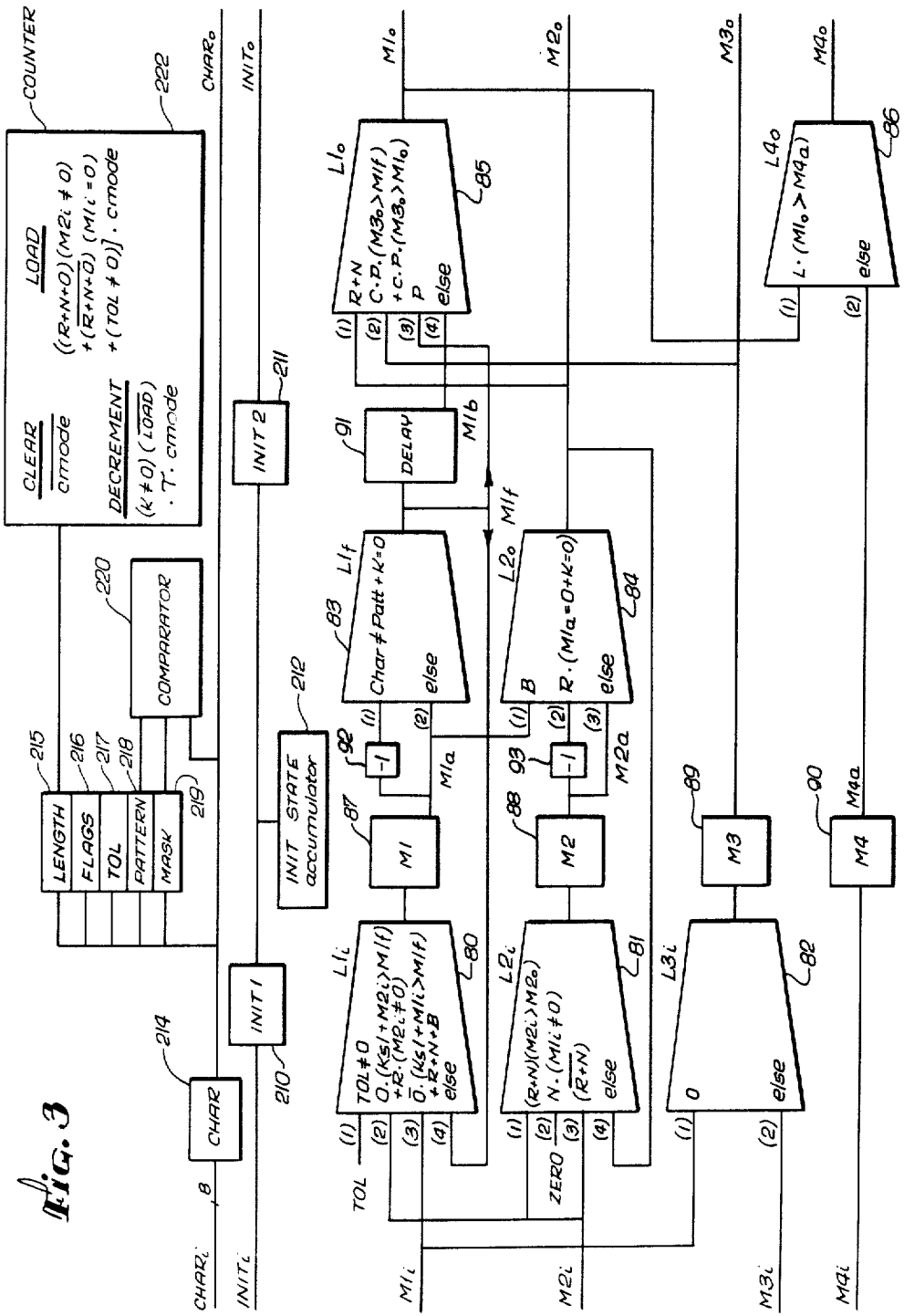

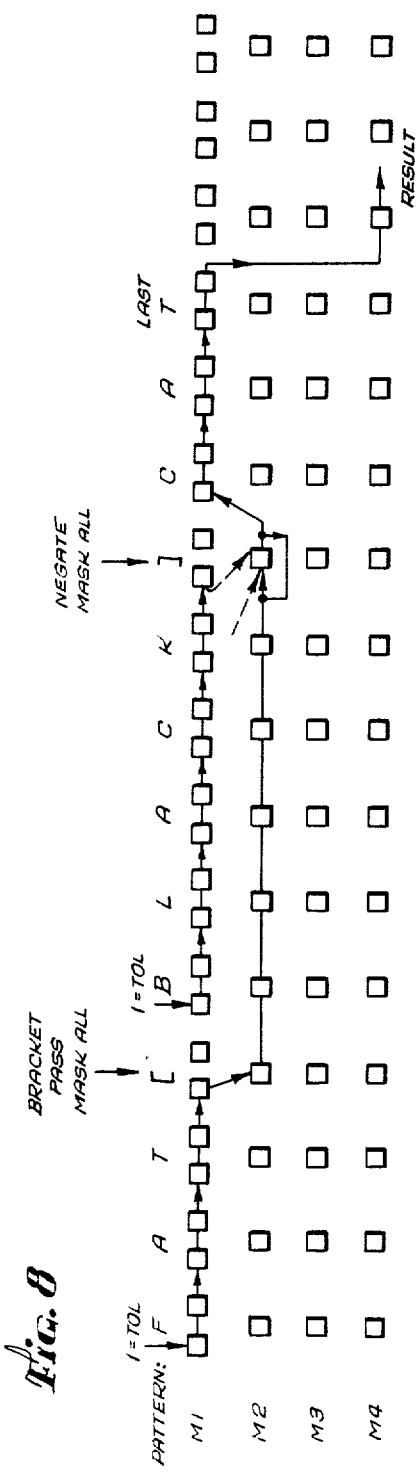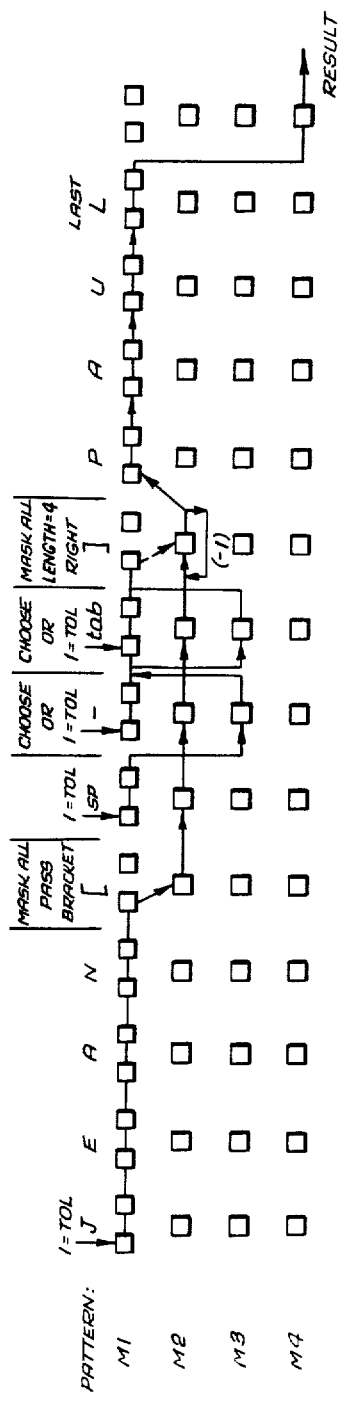

FAST SEARCH PROCESSOR

CROSS REFERENCE TO RELATED APPLICATION

This application is a contination of Ser. No. 06/726,457, filed Apr. 24, 1985, now abandoned, which is a continuation-in-part of Ser. No. 06/626,432, filed June 29, 1984, now abandoned.

BACKGROUND OF THE INVENTION

This invention relates generally to information processing systems, and more specifically, to special-purpose processors for searching data bases to locate particular patterns of data. This type of processing arises in a number of different contexts, but can be best understood in terms of a search of a data base to locate all the occurrences of a particular word or phrase. In the past, computer software has been used to perform such searching, but has been found to suffer from a number of practical limitations.

Conventional hardware for sequentially searching a large data base from beginning to end is likely to take so much time as to be totally impractical, and various software techniques have been used to organize the data in such a way that the system has relatively good performance for what is considered a typical search. These techniques usually involve some type of indexing scheme, in which large tables contain the location or locations of every item in the data base. These index tables may be comparable in size to the actual data base, and they are often cumbersome to build and organize. Moreover, a system that requires indexing tables is inconvenient to use for searching data bases of which the content may vary with time.

Even with the use of index structures, software searching is very much dependent on the number and complexity of search conditions imposed for a given search task, and the general-purpose computer employed has an operating system overhead that further slows the searching process. As a result, actual data processing rates that can be obtained are usually one a fraction of the maximum data rates of mass storage devices on which data bases are usually stored.

Because of the limitations of software-controlled searching techniques, hardware devices to aid in the searching process have been devised. These fall into two categories: content-addressable memories and special-purpose processors. Content-addressable memories are memory devices capable of comparing their contents with a pattern presented on a common bus. Such memories are prohibitively expensive for large data bases, and, in any event, have limited utility, since they are typically capable of performing only exact match operations.

Special-purpose processors for data searching employ low-cost memory from which data is accessed by dedicated pattern-matching circuitry. The search conditions are typically stored in the processor prior to the search, and data is fed into the processor during the search. A particularly desirable form of a special purpose processor incorporates all of its logic onto a single integrated-circuit chip, with an expansion capability based on the use of several interconnected chips.

One such processor, by Mead and associates at the California Institute of Technology, uses a 128-bit comparator to compare test input with a resident pattern. (See Mead, C. A. Pashley, R. D., Britton, L. D., Daimon, Y. T., and Sando, S. F. "128-bit Multi-Comparator," *IEEE Journal Solid State Circuits*, SC-11(5):692-695, October (1976). A mask register allows the equivalent of variable-length "don't care" characters in the pattern. In other words, the pattern may be designated as containing a variable-length segment, the content of which does not affect the matching process.

Foster and Kung have proposed a systolic pattern-matching chip consisting of two kinds of cells. (See Foster, M. J., and Kung, H. T. "The Design of Special-Purpose VLSI Chips," *IEEE Computer*, 13(1), January, 1980). The processor does not store the pattern being searched for, requiring its recirculation along a parallel data path to the data being searched. The systolic nature of this processor, which implies a pipeline of interconnected cells with each cell only sharing signals with its immediate neighbors, makes it particularly adaptable to high density layout in integrated circuits.

A second systolic design was proposed by Mukhopadhyay of the University of Central Florida with a structure including a pipeline of a single type of cell. (See Mukhopadhyay, A., "VLSI Hardware Algorithms," In Rabbat, G. (editor), *Hardware and Software Concepts in VLSI*, ch. 4, pp. 72-94, Van Nostrand Reinhold, 1983). In this system, a pattern is loaded in from one end of the pipeline and text data to be searched is loaded in from the opposite end. The system allows both fixed-length and variable-length "don't care" characters.

Even though these and other proposed systems perform pattern matching at high speeds with various "don't care" capabilities, they do not represent complete data search systems. For example, these systems do not perform Boolean functions, complex proximity functions, or handle approximate matches. Accordingly, a system built around such devices would have an unpredictable response time, depending on whether or not the special hardware could be used. This is, in many ways, the same problem that faces traditional software solutions.

It will be appreciated from the foregoing that there is still a need for an improved specialpurpose processor that can perform a variety of search functions, and can preferably be incorporated onto a single integrated-circuit chip. Ideally, the improved processor should be capable of searching a data base at a speed limited only by the rate at which the storage medium can be accessed, hence providing maximum possible throughput of data. The present invention is directed to these ends.

SUMMARY OF THE INVENTION

The present invention resides in an improved special-purpose processor, and a related method for its use, for high-performance data searching. The processor includes multiple identical cells connected together serially, each of which contains a pattern register, a character register, a number of control flags and fields, and at least one match register. Prior to operation in a search mode, the cells are initialized to contain a desired search pattern, stored in the pattern registers, and to contain a desired configuration of flags and fields to control the search. Then, a data stream to be searched is fed into the serially-connected string of cells, and is moved through the string by clocking signals. At each clocking signal, a character comparison is performed in every cell. If there is a match between a portion of the data stream being searched and the pattern stored in the device, there will be a succession of matches in the string of cells, and a match signal will be propagated through the string, to emerge with the data stream as an indication of a located match. The connected string of match registers is referred to as a match line. When a match is found between a pattern stored in the character registers of consecutive cells and a string of characters in the data stream, a match indicator is propagated along the match line.

In accordance with one aspect of the present invention, a plurality of match lines are employed to perform additional functions in matching the data stream to the stored pattern. More specifically, a second match line is used to provide a parallel path for a match indicator, and a third match line is used to provide temporary storage for match indicators from the first match line. Control flags within each cell are used to control movement of match indicators between the various match lines. In accordance with a second and separate aspect of the invention, the match indicators are multi-level tolerance values indicative of a degree of match, rather than being binary match-nonmatch indicators.

Briefly, and in general terms, the special-purpose search processor of the invention comprises a plurality of serially-connected cells, each including a pattern register, a character register, a comparator, and a match register, the character registers of the cells being serially connected to form a character line and the match registers of the cells being serially connected to form a match line. Also included are means for initializing the cells to contain a pattern to be detected in a data stream, means for inputting the data stream into the character line, means for inputting a match indicator or tolerance value into the match line, clock means for gating the data stream from cell to cell, means in each cell for generating a match signal upon the comparison of the character and pattern registers and either clearing the match indicator or decrementing the tolerance value in the match line if there is no match, and additional register means in the match line, to delay propagation of the tolerance value in the match line. One preferred embodiment of the processor also includes at least one additional match-line register in each cell, serially coupled to form at least one additional match line, and means within each cell for controlling movement of match indicators between match lines, to effect a variety of search functions.

More specifically, one of the search functions that can be performed with the aid of multiple match lines is a logical OR function, to locate alternate patterns in the data stream without multiple passes through the processor. Another related function is to perform a logical OR for multiple patterns having a common prefix. For example, one can find the occurrences of BLACK CAT or BLACK DOG or BLACK HORSE in the data stream.

Another function performed using multiple match lines is the negate function. This permits searching for a pattern that includes defined strings of data, but does not include another defined string.

In accordance with other aspects of the invention, searching may also be performed for patterns that include fixed-length or variable-length strings of any characters ("don't care" characters) or variable-length strings of a single repeated character.

It will be appreciated from the foregoing that the present invention represents a significant advance in the field of search processors. In particular, the processor of the invention provides for a multiplicity of search conditions using identical cells for the storage of a search pattern and various control flags. Searching is accomplished rapidly and with a minimal use of cells for pattern storage when multiple patterns are to be searched. Other aspects and advantages of the invention will become apparent from the following more detailed description, taken in conjunction with the accompanying drawings.

BRIEF DESCRIPTION OF THE DRAWINGS

FIG. 3 is a block diagram showing the structure of a single search processor cell;

FIG. 8 is a match line diagram showing use of a "negate" function;

FIG. 9 is a match line diagram showing use of a "right bracket" function.

DESCRIPTION OF THE PREFERRED EMBODIMENTS

Figure 1:
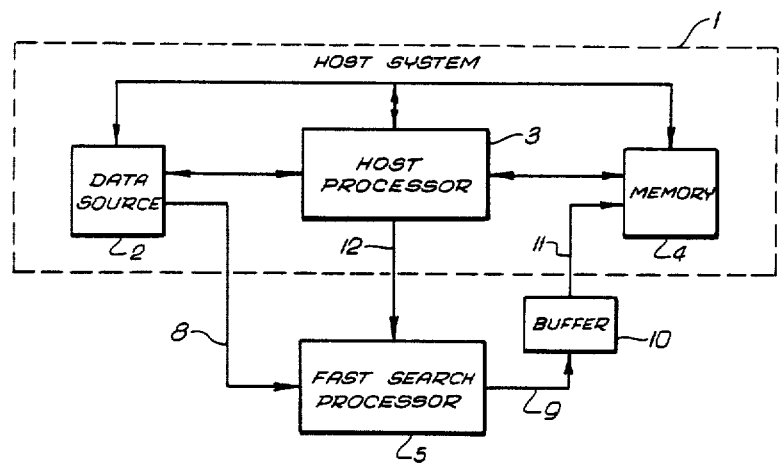
FIG. 1 is a block diagram of a fast search processor connected to a host system.

As shown in the drawings for purposes of illustration, the present invention is concerned with special-purpose processors for searching streams of data, such as from data bases. For convenience, this detailed description is divided into two parts. Part A contains a largely functional description of the processor and its various features. Part B contains specific circuitry and logic relating to the design and construction of the processor, and further examples of the search operations that may be performed. Much of the material in Part B was included in the cross-referenced parent application.

PART A

Overview:

As shown in FIG. 1, the environment in which the present invention is used includes a host computer system, indicated by reference numeral 1. The host system 1 includes a data source 2, a host processor 3, and a result memory 4, and may have any appropriate detailed architecture. Typically, the data source 2 is a high-speed magnetic disk storage system, the host processor 3 is a conventional general-purpose processor, and the memory 4 is a conventional random access memory.

The fast search processor of the invention, indicated by reference numeral 5, receives data from the data source 2 over line 8, and transmits results over line 9 to an output buffer 10, and from there to the result memory 4, over a low-speed line 11. The search processor 5 is controlled in an initialization mode, in a search mode, and in a diagnostic mode, by signals received over line 12 from the host processor 3.

In the initialization mode, initial values are loaded into the search processor 5 over line 12. Then, in the search mode, the processor searches a data stream provided at high speed over line 8, and transmits match results at the same high speed over line 9 to the output buffer 10. A design goal of the search processor 5 is to be able to search the data stream at a speed comparable to the access rate of the data source 2. Large data bases can then be searched serially in a reasonable time, without the use of complex and costly indexing schemes.

Figure 2:
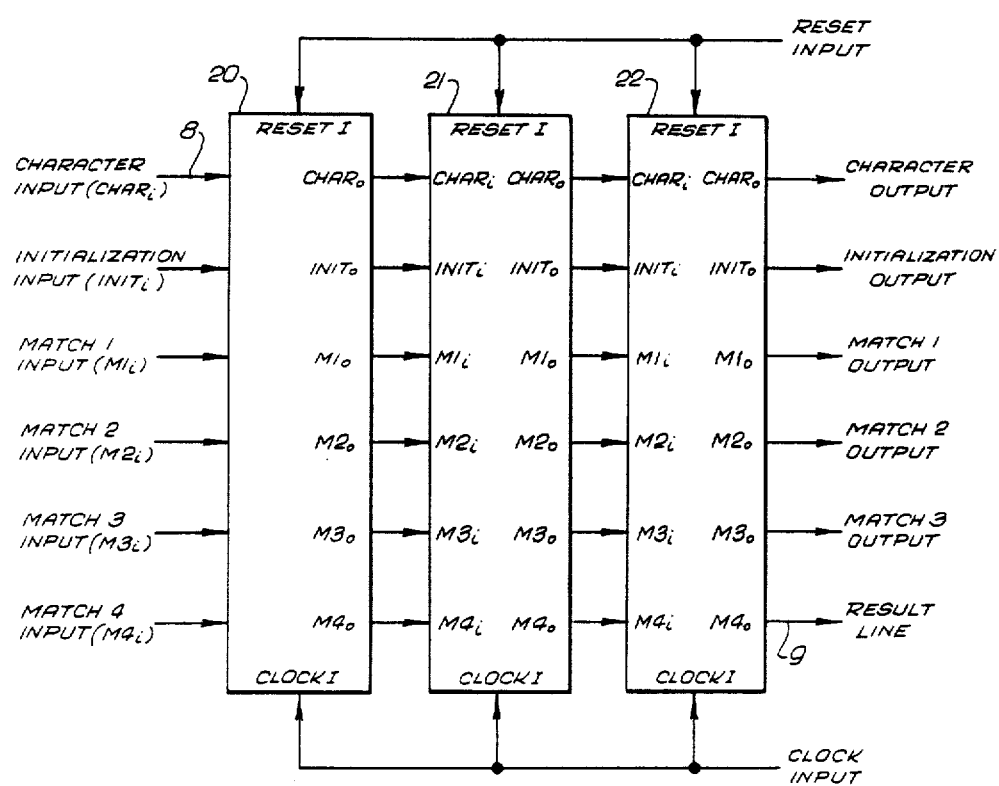
FIG. 2 is a block diagram showing a number of cells connected serially together.

The search processor of the preferred embodiment of the invention comprises a multiplicity of identical cells, three of which are shown at 20–22 in FIG. 2. The structure of each cell will shortly be explained with reference to FIG. 3, but initially one need only understand that each cell contains a character of a pattern to be searched for, and has a character line (CHAR), an initialization line (INIT), and four match lines (M1–M4), each with an input and output. These lines are connected together serially from cell to cell. Characters in the data stream on line 8 are input to the character line of the first cell 20, and then, on subsequent clock cycles, are shifted through the remaining cells 21 and 22.

The first match line M1 is the line on which match results are principally propagated from cell to cell. The fourth match line M4 is used to carry a final match result, and the m4 output from the last cell 22 is the result line 9 in FIG. 1. The value on the match line M1 indicates a match by the presence of a non-zero value. A zero on the match line represents a non-match. Rather than carrying a simple binary match or non-match value, the match line can be employed in a more general sense to carry a tolerance value indicative of the degree of match. In the first cell of a pattern, this value is initialized to some positive integer, such as "3," whose value is the number of characters of the stored pattern which, is different from the corresponding characters of a character sequence in the data stream, will cause the processor to declare that the character sequence does not match the pattern. If this tolerance value emerges on the result line 9 without change, there is a perfect match. A one-character error (i.e., discrepancy) between the data stream and the stored pattern would result in a "2" value at the output line 9, and so forth. An "0" value at the output line 9 would indicate "no match" because of a 3-or-more-character error between the data stream and the stored pattern.

Operation of the cells is in accordance with a relatively straightforward logical sequence, which is identical from cell to cell. At each clock cycle, and in each cell, the character currently in the cell is compared to a pattern character previously stored in the cell. By way of example, the letters C-A-T are assumed to be the pattern characters stored in cells 20–22, respectively. If the characters CAT were to appear in the input data stream, the incoming C would match with the pattern C in the first cell 20. As the character C passes to the second cell 21, it is followed by on match line M1, a tolerance value indicative of a match in the first cell. More precisely, the indication of a match propagates to the second cell concurrent with the next data character following the matching one. Two clock cycles after the match of C characters, the incoming A character is introduced to the second cell 21 and a match is found with the pattern character A in that cell. The architecture of the individual cells is such that the tolerance value emerging on match line M1 from the first cell 20 will be passed through the second cell 21 if a match is found in that cell also. Similarly, when the incoming T character is found to match the pattern stored in the third cell 22, the tolerance value on match line M1 emerges from the third cell. In this example, the third cell is the last one in the pattern end, as will be explained, contains a "last" flag that has the effect of transferring the tolerance value from match line M1 to match line M4, from which it emerges on result line 9 to indicate a perfect match. How this comparison function is performed will become apparent from the following description of alternate structural embodiments of a single cell.

Figure 3A:
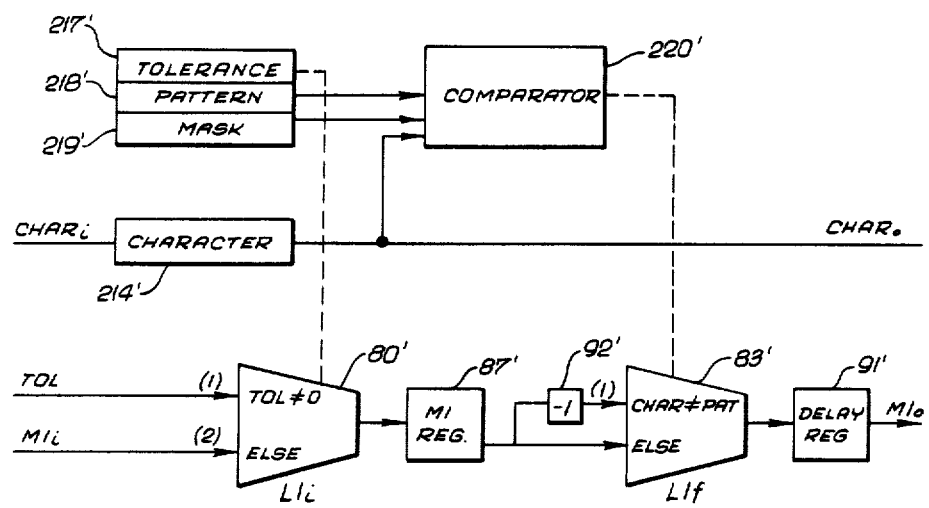
FIG. 3a is a block diagram of an alternate form of the search processor cell.

Cell Structure with Single Match Line:

The simplest form of the cell structure includes only a single match line M1, as shown in FIG. 3a. The match line is employed to carry a tolerance value of two or more, to represent a degree of mismatch to be tolerated. An initial tolerance value is decremented at each cell position in which a mismatch is detected, and emerges from the search processor to provide an indication of the degree of match between the search pattern and a string of characters in the data stream being searched.

In this description, the subscript "i" refers to an input signal, as in $M1_i$, and the subscript "o" refers to an output signal, as in $M1_o$. Each of the logic elements 80' and 83' is a priority multiplexer, having multiple inputs, designated by numbers in parenthesis, and a single output. The operation of each logic element is that the output is chosen from the input whose associated input logic condition is true. The logic conditions are set forth in abbreviated form in the logic boxes and are further elaborated on in Part B of this description. If more than one input logic condition is true at the same time, the uppermost input, i.e. the one with the lowest input line number, is chosen as the output. The operation of these logic elements will shortly become clear.

The cell includes a tolerance register 217', a pattern register 218', a mask register 219', a character register 214', and a comparator 220'. The single match line includes an input logic element 80', an M1 match register 87', a second logic element 83', a decrementing circuit 92', and a delay register 91'.

The input logic element 80' has only two inputs: one from the tolerance register, if the register contains a non-zero value, and the M1 input line $M1_i$. The match register 87' is loaded with the $M1_i$ value only if the tolerance register contains a zero value. Logic element 83' operates to decrement the tolerance value is there is no match between the pattern and character registers. The delay register 91' is necessary for timing purposes, as will become clear from the following simple search example. Initialization of the alternative cell structure is performed in a manner to be subsequently described in this specification.

In FIG. 3a, the output of the tolerance register 217' and the comparator 220' are shown as connected to logic elements 80' and 83', respectively, by broken lines. This is because these outputs connect to logic circuitry internal to logic elements 80' and 83' but not shown in FIG. 3a, which implement the logical expressions within the elements. In other words, the contents of the tolerance register and the output of the comparator are transmitted to the logic elements 80' and 83' and used to control selection of inputs to those elements.

Simple Search Function:

The simple search can be made with the use of only the single match line M1 of FIG. 3a. The mechanics of the search can best be explained in terms of a specific example, shown in FIG. 4. Three consecutive cells, indicated as $c_1$, $c_2$ and $c_3$, are initialized with a pattern to be searched for in the incoming data stream. In the example, the search pattern is the word CAT. The pattern registers 218 of the cells contain the letters C, A and T, respectively. The length registers 215, the flags 216 and the mask register 219 are not used in the example. The tolerance register for the first cell (the $c_1$ cell) is loaded with a desired match tolerance. In the example, this is assumed to be a "1", meaning that a perfect match is desired. The tolerance registers of the other cells are set to zero. It will be noted that the tolerance register value will be introduced into the M1 match line, through input (1) of logic element 80', only if the value is non-zero. Accordingly, a tolerance value of "1" will be introduced into the M1 register of the first cell each time a new character is clocked into the cell.

After initialization, the cells have the following contents:

|  | $c_1$ | $c_2$ | $c_3$ |
| --- | --- | --- | --- |
| Pattern | C | A | T |
| Mask | U | U | U |
| Tolerance | 1 | 0 | 0 |
| Last Flag | 0 | 0 | 1 |

The mask flag has a certain bit set to force a match regardless of whether upper or lower case characters appear in the date. This is indicated by the letter U.

The key to the matching process is in the role played by the L1$_f$ logic element 83' and the delay register 91'. If there is no match between the character register 214 and the pattern register 218', input (1) is chosen in this logic element, and the tolerance value is decremented to zero in the decrementing circuit 92s. (The decrementing circuit 92' is designed not to decrement the tolerance value below zero). Thus, a non-match in any cell will result in zeroing of the tolerance value in the M1 match line. When a match is found, however, input (2) is selected in the M1$_f$ logic element 83', and the tolerance value is not decremented.

If a letter C is input to the first cell $c_1$, a match will be found and a tolerance value of "1" will be passed to the delay register 91'. The purpose of the delay register 91' is to synchronize the propagation rate of the tolerance value on the M1 match line with that of the data on the character line. For a search pattern of n characters, it will take 2n clock cycles for an n-character sequence within the data stream to pass completely across the search pattern. Therefore, to provide a match result out of the processor when the last data stream character is emerging requires that the M1 match line values progress along the line at half the character clocking rate. The delay register at each cell position takes care of this timing difference. Another way to appreciate the need for the delay is to consider the number of clock cycles that must occur between the matching of two adjacent characters. After the matching of the C's in cell $c_1$, shown in line (b) of FIG. 4, two clock cycles must occur before the A's are aligned for match detection cell $c_2$, as shown in line (d).

Figure 4:
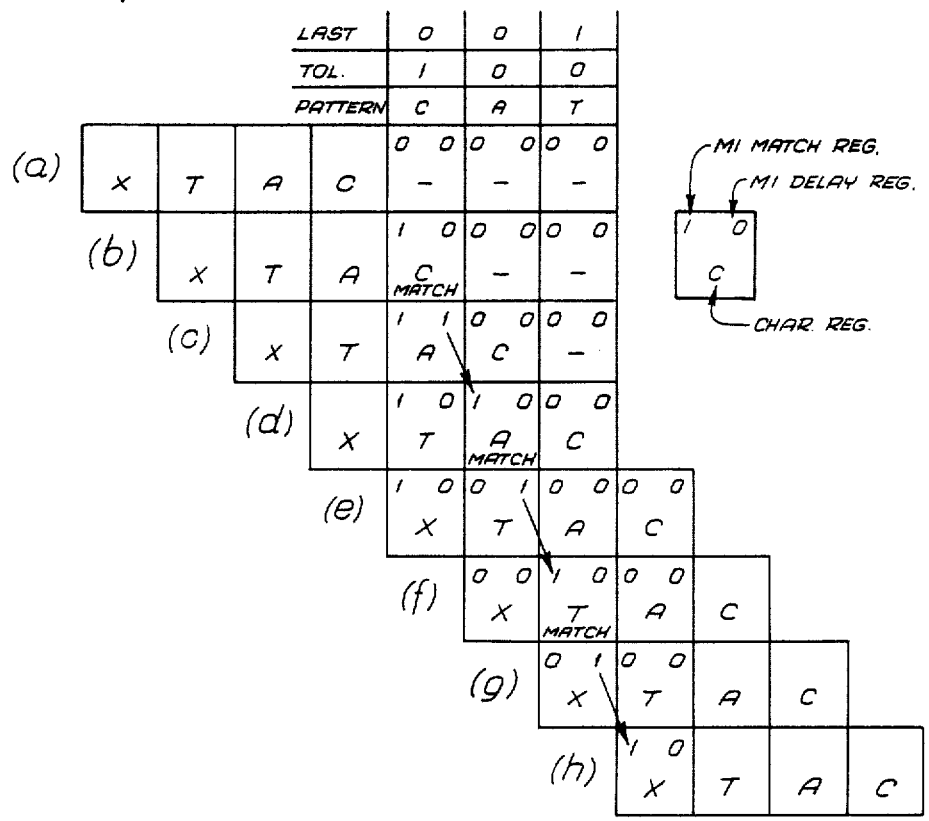
FIG. 4 is a table showing a simple search sequence using the structure of the invention.

In line (a) of FIG. 4, the letters CATX are shown as approaching the search pattern. The two numerals in each cell represent the tolerance values at the M1 register and the delay register, respectively. These are initially all zero. In line (b), the letter C has advanced to the first cell $c_1$ and a "1" has been introduced into the M1 register. In line (c), the letter C has advanced to the second cell $c_2$ and the letter A as in the first cell $c_1$. Since there was a match in the previous line in the first cell $c_1$, a "1" tolerance value will advance to the delay register in this cell. On the next clock cycle, as shown on line (d), the "1" from the delay register of the first cell is shifted into the M1 register of the second cell $c_2$, where the data character A is aligned with the A of the search pattern. On the next cycle, on line (e), the "1" is advanced to the delay register of the second cell $c_2$, since there was previously a match in that cell. In the next cycle, on line (f), the "1" is propagated to the M1 register of the third cell $c_3$, where the T characters now match. In line (g), the "1" moves to the delay register of the third cell $c_3$, because of the previous match in that cell. The final step is shown in line (h), in which the tolerance value of "1" emerges from the search pattern with the letter X, which immediately follows the pattern located in the data stream. It will be seen that the tolerance value will propagate across the search pattern of cells only f a match has been detected in each successive cell of the pattern.

If a tolerance value higher than "1" were introduced in the first character of the search pattern, one or more errors could then be tolerated in the data stream. For example, if a tolerance value of "3" were used, CAT would produce a result of "3", COT a result of "2", and C a result of "1". Each error decrements the tolerance value by "1". In a three-letter pattern, all three letters would have to be in error to reduce the tolerance value to zero.

Although this simple search can be performed as described, using a single match line, a more powerful search processor results when multiple match lines are employed. The following section describes the cell structure of such a processor.

Multiple Match Lines - Overview:

Although the simple search described operates at high speed as desired, it is somewhat limited in terms of the types of searches that can be made. For example, a simple OR search, such as CAT or DOG, would require two passes of the data stream if the simple search technique were to be employed.

In accordance with an important aspect of the invention, multiple match lines are employed to provide the search processor with extended capabilities. Second and third search lines are used principally as registers for the temporary storage of match results. For this usage of multiple match lines, a number of manipulative functions are needed for the match lines, to enable splitting of a line, exchanging positions of lines, combining lines, and so forth. These basic functions are controlled by flags stored in a flag register in each cell, as explained in the following sub-sections.

Cell Structure with Multiple Match Lines:

Each cell, as shown in FIG. 3, includes seven logic blocks indicated by numerals 80–86, the function of which will be explained as the description proceeds, four match registers 87-90, a delay register 91, and two decrementing circuits 92 and 93.

As in the description of FIG. 3a, the subscript "i" refers to an input signal, as in $M1_i$, and the subscript "o" refers to an output signal, as in $M1_o$. the subscripts "a" and "b" refer to intermediate signals, between input and output. Each of the logic elements 80-86 is a priority multiplexer, having multiple inputs, designated by numbers in parentheses, and a single output. The convention for each logic element is that the output is chosen from the input whose associated input logic condition is true. The logic conditions are set forth in abbreviated form in the logic boxes and are further elaborated on in Part B of this description. If more than one input logic condition is true at the same time, the uppermost input, i.e. the one with the lowest input line number, is chosen as the output. The operation of these logic elements will shortly become clear.

The first match input line $M1_i$ is connected to input (3) of logic element 80, which is also designated $L1_i$. The output of this element passes to the M1 match register 87, from which two possible inputs to logic element 83 are derived. Input (1) to logic element 83 is derived by decrementing the M1 register value, in circuit 92, and input (2) is derived directly from the M1 register 87. The output of logic element 83, also designated $L1_f$, passes through the delay register 91 and thence to logic element 85 ($L1_o$) as input (4). The output of logic element 85 is the first match line output $M1_o$. Alternate paths for the first match line are a feedback path from the output of logic element 83 to input (4) of the logic element $L1_i$ 80, and a path that bypasses the delay 91, extending from the output of logic element 83 to input (3) of logic element $L1_o$ 85.

The input for the second match line $M2_i$ is connected to inputs (1) and (3) of logic element 81, and as input (2) of logic element 80. The output of logic element 81, also designated $L2_i$, is connected to the M2 match register 88, and thence to input (3) of logic element 84 (directly) and to iput (2) of the same element (through decrementing circuit 93). The output of logic element 84, also known as $L2_o$, is the second match line output signal $M2_o$, which is also fed back to input (4) of the input logic element $L2_i$ 81. Input (2) of element $L2_i$ is a forced zero value, and input (1) of logic element $L2_o$ 84 is derived from a value $M1_a$ output from the M1 match register 87.

Figure 3B:
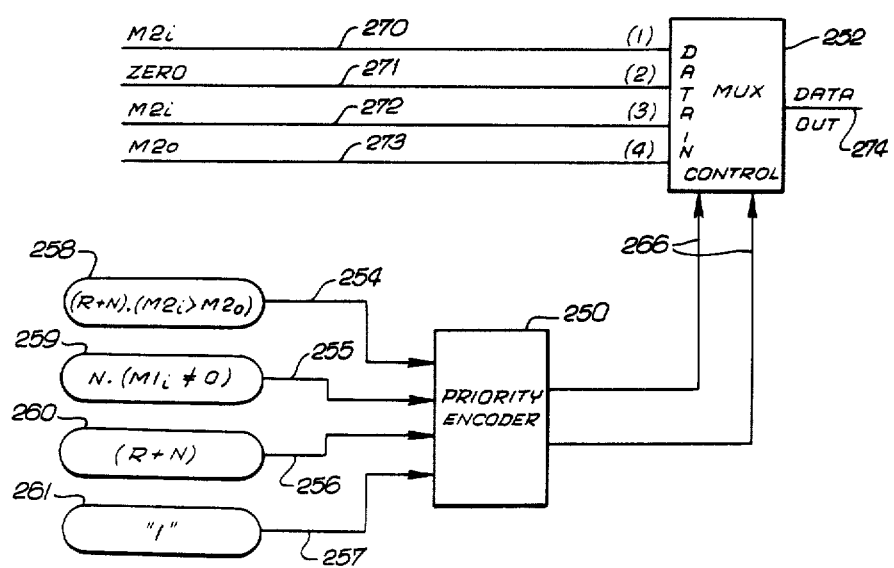
FIG. 3b is an exemplary logic diagram showing further detail of one of the logic elements in FIG. 3.

By way of example, FIG. 3b shows the $L2_i$ logic element 81 in more detail. Bascially, the logic element includes a priority encoder 250 and a multiplexer 252. The encoder 250 has four inputs, on lines 254-257, which derive their binary inputs from the logical expressions shown in the respective blocks 258-261. When an expression in one of the blocks is true, a "1" input signal is generated on the corresponding input line. If only one of the inputs is a "1", its position is converted by the encoder 250 to an address signal output on lines 266 to the multiplexer 252. If more than one input is a "1," the priority encoder 250 selects the input line nearest the top of the block, i.e, the line with lowest reference numeral. The multiplexer 252 operates in a conventional manner and converts the address on lines 266 to a 1-in-4 internal selection signal, which is used to select one of four input lines 270-273 for output from the multiplexer. The other logic elements in FIG. 3 operate in substantially the same way.

The third match line input $M3_i$ is connected to input (2) of logic element 82, also known as $L3_i$, input (1) being derived from the $M1_i$ signal. The output of logic element $M3_i$ is connected to the M3 match register 89, and thence to the output line $M3_o$.

The fourth match line input $M4_i$ is connected as the only input to the M4 match register 90, the output of which is connected as input (2) to the logic element 86, also knonw as $L4_o$. Input (1) to the logic element $L4_o$ is derived from the first match line output $M1_o$, and the output is the fourth match line output $M4_o$.

The cell structure also includes first and second initialization registers 210 and 211. An input initialization line $INIT_i$ is coupled to the first initialization register 210, the output of which is coupled to the second register 211, from which an output initialization line $INIT_o$ is derived. An initialization state accumulator 212 is connected to the line between the registers 210 and 211.

The character input line, designated $CHAR_i$, provides the input to a character register 214. A number of other storage registers are shown as connected to the character line, since their values are initialized through the character line. These are the length register 215, the flag register 216, the tolerance register 217, the pattern register 218 and the mask register 219. A comparator 220 receives data from the pattern register 218, the character line and the mask register 219. Bascially, the comparator 220 compares the data in the character register 214 with the data in the pattern register 218, in conjunction with a mask stored in the mask register 219. The only element of the cell yet to be discussed is the counter logic 222. This operates in conjunction with the length register 215 and certain flags in the flag register 216, to control an internal counter used in searching functions.

All of the searching functions and conditions can be understood by reference to the basic cell diagram of FIG. 3. The specific flags in the flag register 216 will be introduced was particular functions are described.

Figure 5:
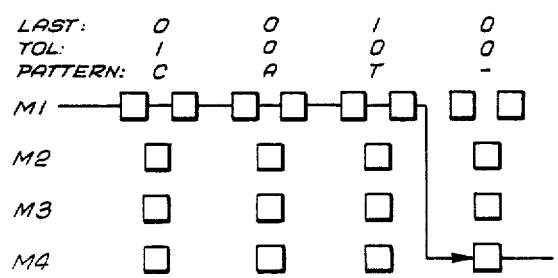
FIG. 5 is a match line diagram showing a simple search operation.

It will be understood from the foregoing description that the simple search function described with reference to FIG. 3a can be performed in the same manner using the cell stucture of FIG. 3. The only difference is that the processor using multiple match lines makes use of the M4 match line as a result line. When the last flag is set in a cell, usually the last cell in a search pattern, the tolerance value on the M1 line is transferred to the M4 line. This is shown in FIG. 5 which is a match line diagram showing in diagrammatic form how tolerance values are propagated through the interconnected cells. As shown, the tolerance value propagates along the M1 match line until cell $c_3$ is reached. Then the presence of the last flag causes transfer of the tolerance value to the M4 match line. In FIG. 3, this is the path through input (1) of the $M4_o$ logic 86. It should also be understood that one can enjoy the same cell structure without the use of tolerance values. In this special case, the tolerance values are always initially unity. The first decrementing action on a tolerance value effectively clears it to zero, indicating a non-match.

The Flags:

The following is a list of the flags, which are one-bit fields within the flag register 216 of each cell:

P: Pass flag
B: Bracket flag
O: OR flag
C: Choose flag
R: Right flag
N: Negate flag
I: Infinite flag L: Last flag The flags used in a simple OR search will be explained first. The remaining flags will be discussed later.

The Bracket Flag:

The bracket flag effects a splitting or branching of the M1 match line. A dedicated cell is needed to perform this function. In other words, no pattern character can be stored in a cell with the bracket flag set. Its effect is to transfer the output of the M1 match register (the $M1_a$ output) to the M2 output line of $M2_o$ of the same cell. On the M2 match line, any value loaded into the M2 register from the $M2_i$ input lines will be ignored when the bracket flag is set. The effect of the bracket flag can be appreciated in FIG. 3, which shows the $M1_a$ output as providing input (1) to the $L2_o$ logic element 84.

The Pass Flag:

The pass flag is set in a cell in which there is a need to bypass the delay register 91 in the M1 match line. Normally, it is desired that the tolerance value in the M1 match line should propagate from cell to cell at half the rate of character propagation. However, there are exceptions that require the delay to be bypassed in some cells.

One exception is in a special-purpose cell, such as one in which the bracket flag is set and no pattern-matching function is performed. Another use of the bypass flag is in the last character of a pattern. If the bypass flag is set in this cell, the result will emerge with the last character of the pattern, rather than with the next subsequent character, and this may be more convenient for some applications. Yet another use of the pass flag is in conjunction with variable-length "don't care" operations, to be discussed.

The Tolerance Register:

The tolerance register 217 is not a flag; it is another register separate from the flag resistor. It is initialized with a positive integer indicating the maximum mismatch that will be tolerated in a pattern search. The tolerance value is typically set only for the first character of a pattern of interest. The tolerance register value, if non-zero, is loaded into the M1 match register 87, as indicated by input (1) of $L1_i$ logic element 80. If the tolerance register contains zero, as will be the case for most cells of the pattern, the input for the M1 match register is usually derived from the M1 input match line $M1_i$.

The Last Flag:

The last flag is set in the last character of a pattern to be searched for. In a cell in which the last flag is set, the values in the M1 delay register 91 and the M4 match register 90 are compared, and the larger one is placed on the M4 output line $M4_o$. This is apparent from FIG. 3, in which the $L4_o$ logic element 86 has its first input (1) derived from $M1_o$ if the last flag is set and $M1_o > M4_a$, $M4_a$ being the output from the M4 match register 90. As will now be discussed, the function of the last flag is also used in logical OR operations.

The Basic OR Search:

The basic OR search has as its goal the location of two or more alternative patterns in the data stream being searched. For example, one may wish to locate the occurrences of the words CAT or DOG or MAN. A simple search using only one match line would require three passes through the entire data stream to perform the OR function. In the present invention, the OR search is made using match line M4 in conjunction with the tolerance register 217 and the last flag.

Figure 6:
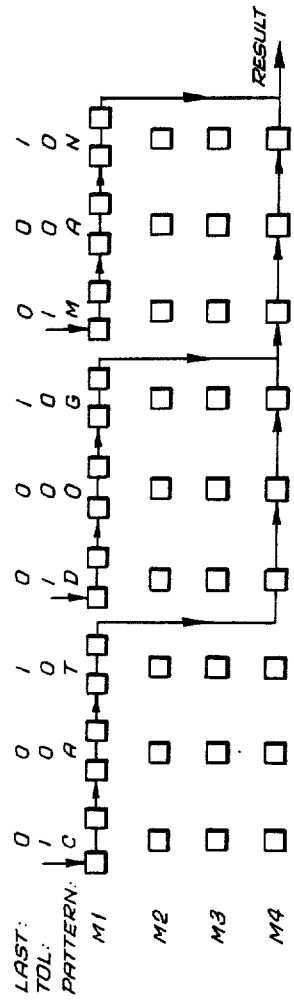
FIG. 6 is a match line diagram showing a simple logical OR operation.

As shown in FIG. 6, the first pattern, CAT appears in the cells in a normal manner. The C character sets the tolerance register to a desired value, and the last character, T, has the last flag set. Thus, the result of the CAT match, if any, is transferred to the M4 match line. It will be recalled that a match result emerges from the last cell of a pattern with the character following the last matching character of the data stream being searched. If the letter following CAT is assumed to be X, for example, then the match resul will emerge from the T cell as the X character emerges from the character register of the T cell. Since the M4 match line has only one register, the match value will propagate along the M4 match line in synchronism with the X character of the data stream.

Since a logical OR function is required, it is important that any match result from the CAT pattern not be associated with the search for the DOG pattern. This requires that the first letter of the DOG pattern should reset the tolerance value to a selected value, regardless of whether or not there was a match in the first pattern. Therefore, the D character of DOG and the M character of MAN have their tolerance registers initialized at a desired value. The last cell, G, of the DOG pattern also has its last flag set, causing the result of the DOG search to be transferred to the M4 match line. In most OR searches, this will not cause any conflict in results on the M4 match line, since the result from the CAT search will have propagated out of the processor by the time the result of the DOG search reaches the M4 line. In other words, the results of the CAT and DOG searches will emerge from the processor at different times.

To allow for the possibility that some search configurations would cause a conflict between a search result on the M4 line and a search result about to be transferred to the M4 line, the last-flag logic selects the larger match value for the output on the M4 line. This is shown in the input logic for input (1) of logic element 86 ($L4_o$). Such a conflict between results on the M4 line would occur only when two ORed search patterns were of equal length and were almost identical, within the tolerance selected for the search. For example, a search for DOG or LOG with a tolerance of two or more would result in both OR paths detecting a match when DOG appeared in the data stream. DOG would match exactly and LOG would match with a lower tolerance but both match results would compete for the $M4_o$ line and the larger tolerance would be selected.

The addition of the third search pattern, MAN, is treated in identical fashion. The M character of the pattern resets the tolerance value for the search, and the N character of the pattern has its last flag set, to transfer any match result to the M4 line.

The OR Flag:

The OR flag affects three match lines: M1, M2, and M3. When a clock pulse occurs in a cell with the OR flag set, the M2 input value, on line $M2_i$, is loaded into the M1 match register 87, and the M1 input value, on line $M1_i$, is loaded into the M3 match register 89. These signal paths may be readily observed in FIG. 3, in which the (1) input to the $L3_i$ logic element 82 is derived from $M1_i$ when the OR flag is set, and the $M2_i$ value is selected for input to the M1 match register when the OR flag is set and certain other logical conditions are true. When used subsequent to a bracket flag, the OR flag permtis retrieval of a previous result saved in the M2 match line, and at the same times saves the current M1 match result in the M3 match line. THe practical importance of the OR flag will become apparent from examples to be described after the choose flag has been introduced.

The Choose Flag:

The choose flag affects the output of the first match line, on line $M1_o$. On each clock pulse in a cell in which the choose flag is set, the values in the M3 match register 88 and the M1 delay register 91 are compared, and the larger value is output on the $M1_o$ output line. This choise is made by input (2) of the $L1_o$ logic element 85. If the pass flag is set as well as the OR flag, the M3 delay register 91 is bypassed and the comparison is made between M3 and the output from the M1 match register 87, on line $M1_f$.

Figure 7:
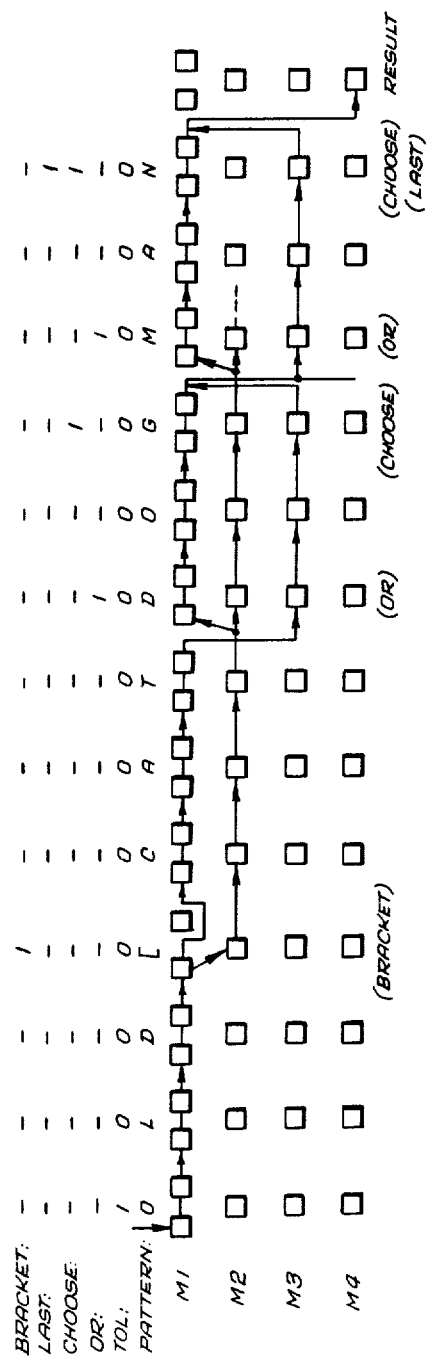
FIG. 7 is a match line diagram showing a common-prefix OR operation.

Common-Prefix OR Search:

The common-prefix OR search is an OR search in which each of the alternative patterns has a common prefix pattern. For example, suppose one wished to locate the occurrences of OLD CAT or OLD DOG or OLD MAN. While this may seen trivial, for longer search patterns it would be desirable not to have to repeat the prefix several times in the search pattern. The common-prefix search solves this problem by means of the bracket, OR and choose flags, as shown in FIG. 7.

The common-prefix pattern, OLD, appears first in the search pattern, and the result of the prefix search appears on the M1 match line in the same manner as in a simple search. The next cell after the prefix is a bracket cell, having both the bracket flag and the pass flag set. As will be recalled, this splits the M1 tolerance value and places it on the M2 line as well as on the M1 line of subsequent cells. In the next segment of the search pattern, the first suffix pattern, CAT, is searched for, so that the last cell (T) in this segment will produce a result indicative of the OLD CAT search. The first cell of the next segment of the search pattern, the D cell, has the OR flag set, and this results in saving the OLD CAT result in the M3 match line and retrieving the prefix search result (OLD) from the M2 match line.

The third segment of the search effects a search for OLD DOG, while propagating the OLD search result through the M2 match line and propagating the OLD CAT search result through the M3 search line. The last letter of the third segment, the G cell, has its choose flag set. In the general case, this effects a choice of the larger of the M3 value and the M1 value. In most practical situations, however, there will be not conflict between the M3 and M1 values. If a match had been found for OLD CAT, by the time a subsequent match has been found for OLD DOG the OLD CAT match value would have been propagated out of the processor. The choose function either takes the OLD CAT match value from m3 or the OLD DOG match value already on M1 and outputs it on the $M1_o$ line.

The fourth segment of the search pattern functions in a similar way to the third. The first cell, the M cell, has its OR flag set, to save the M1 match value in M3 again, and to retrieve the prefix match value from M2. In the fourth segment, matching proceeds for the OLD MAN pattern, and in the N cell the choose flag again effects a choice between the OLD MAN match value on the M1 line and a possible OLD CAT or OLD DOG match on line M3. Again there is little possibility of two simultaneous matches of the alternative patterns, unless the patterns are of equal length and nearly similar content.

In this discussion, the space between the prefix and possible suffixes of the search patterns has been ignored. One simple way to handle this is to consider the space as part of the common prefix. Another solution is to invoke a "don't care" function, to be discussed, and to ignore the imbedded space in the search pattern.

"Don't Care" Character Strings:

There is a common search requirement to ignore strings of characters imbedded in a search pattern. The characters to be ignored are frequently referred to as "don't care" characters. Two cases of interest are the fixed-length don't care and the variable-length don't care strings.

Fixed-length don't care situations are easy to handle using the mask register 219 of selected cells. For example, if one wished to search for a particular date, but the day of the month was not critical, the search pattern might be: MARCH XX, 1972, where XX denote don't-care characters. The search could be implemented by setting all bits of the mask register in the two cells of the search pattern corresponding to the day of the month. Bit positions of the character register corresponding to the set positions of the mask register are ignored in the comparison process. If all bits of the mask register are set, a match in that cell is assured, regardless of the content of the character register.

The variable-length don't care function is effected by means of a special cell with the maks register bits all set, operating in conjunction with the counter and length register 215 in the same cell. The "don't-care" cell is placed in the search pattern at the position at which a variable-length don't care string is permitted. Suppose, for example, one wishes to search for "MARCH" within ten characters preceding "1972." The search pattern will be MARCH*1972, where the asterisk represents the "don't care" cell. The * cell has its length counter initialized to a value corresponding to the don't-care count of ten.

After the pattern for MARCH has been matched in the data stream, a non-zero tolerance value on the M1 match line will have the effect of loading the counter with the value stored in the length register, in this case ten. This is apparent from the second load condition for the counter set forth in FIG. 3. Subsequent characters, up to ten, passing through the "don't care" cell will result in decrementing the counter. Meanwhile, the M1 match result from the match of the pattern MARCH will be recirculated within the cell itself. The mechanism for this recirculation is a feedback signal $M1_f$ from the output of logic unit 83 to input (4) of the $L1_i$ logic element. The action of the * cell is, therefore, to transmit this recirculated match value on the $M1_o$ line up to ten times. If the next following character does not match the "1" in the second part of the pattern (1972), the match value will be decremented in the usual way and a match result may not emerge from the end of the pattern. If the string 1972 follows the string MARCH within the designated ten characters, then one of ten match values output by the * cell will be propagated all the way through the search pattern, indicating a match within the don't-care range that was specified.

A variation of the variable-length don't-care search is obtained by setting the pass flag in the don't-care cell. This permits a zero-length don't-care between the two search patterns. That is to say, the number of don't care characters may be from zero to a selected count, rather than from one to the selected count.

A related search condition is the "variable-length care" condition, in which a specific character may occur repeatedly in a character string. For example, one may wish to find the words FAT and CAT separated by up to five spaces. In this case, the search pattern is FAT CAT, with the fourth cell containing a space character and not having its pass flag set. The length register in this cell is initialized to a value of five, and this value is loaded into the counter when a match is found in the first part of the pattern (FAT). The match value from the first part of the pattern is recirculated five times while the counter is being decremented, so long as spaced appear between the words FAT and CAT. If the second part of the pattern (CAT) appears within five spaces of the first part, one of these circulated match values will be propagated completely through the pattern if the second part of the pattern is detected.

This type of search, i.e. variable-length care, cannot be implemented down to a zero-length. Zero-length would imply a "don't-care" situation, whereas the "care" search requires a specific character to be located. Accordingly, the pass flag cannot be set for this type of search.

The Negate Flag:

The negate flag has the effect of: (1) repeatedly outputting the value in the M2 match register on the M1 output line $M1_o$, and (2) if the incoming value on the M2 input line $M2_i$ is greater than the previous value $M2_o$, loading the incoming $M2_i$ value in the M2 match register. If the incoming $M2_i$ value is not greater than the previous value, M2 will either be retained as it was or will be zeroed, depending on whether $M1_i$ is zero or non-zero. The implications of these alternative actions will become clear from the example depicted in FIG. 8.

The negate flag is used to create patterns that will be considered to match if certain strings are not present in the incoming data stream. For example, if one wishes to find the words FAT CAT but without the word BLACK between them. In other words FAT BLACK CAT would not be a match, but FAT WHITE CAT would be. The search pattern is FAT[BLACKnCAT, where [is a cell with its bracket flag set and n is a cell with its negate flag set.

If the first pattern segment (FAT) is located in the data stream, the match value is passed to the M2 match line by action of the bracket flag, and is also retained in the M1 match line. However, the tolerance value is reset in the first cell of second segment (BLACK). Therefore, at the end of the second pattern segment (BLACK), the M1 match line will carry an indication of whether or not the pattern BLACK was found in the data stream. The $M2_i$ incoming match line will indicate whether a match of the first pattern segment (FAT) was found. When $M2_i$ is greater than its previous value, a match is indicated and M2 match register is loaded. This loading step is through input (1) of the $L2_i$ logic element 81. So long as BLACK has not been found, the negate cell continues to recirculate the value in its M2 match register, and to transfer this value back to the M1 match line. Transfer back to the M1 match line is made through input (1) of the $L1_o$ logic unit 85. Recirculation of the M2 value is made through input (4) of the $L2_i$ logic element 81. If a match is then found for the third segment (CAT), a non-zero match value will emerge from the processor in the usual manner.

If a match is found for BLACK, a non-zero match value is presented to the negate cell on its $M1_i$ line, and this results in a zero value being placed on the M2 match register. This operation takes place as a result of the zero connected to input (2) of the $L2_i$ logic element 81. The zero match value is also transferred to the M1 match line in the negate cell, and no match can then be found for the entire pattern, regardless of whether or not the last segment matches.

In summary, then, the negate logic functions principally as a result of the configuration of the $L2_i$ logic element 81. Input (1) is selected when the M2 register is first loaded in the negate cell, input (2) is selected when a match of the unwanted pattern segment is located, and input (4) is selected when the M2 value is recirculated. It will be understood that the last cell in any search pattern should have its last flag set, to transfer the final result of the search to the M4 result line.

The Right Flag:

The right flag works in conjunction with the length counter and performs a function similar in some respects to that of the negate flag. If the incoming value $M2_i$ on the M2 match line is non-zero, it is loaded into the M1 match register. This is effected through input (2) of the $L2_i$ logic element 80. If the value in the M1 match register is zero, or if the length counter has reached zero, the value loaded into the M2 match register is decremented by one and is output on the $M1_o$ output line. Otherwise, i.e. if M1 is not zero and the counter is not zero, then the value loaded into the M2 match register is output directly onto the $M1_o$ output line. The value output from M2 to the $M1_o$ output line is also recirculated to the M2 match register, through input (4) of the $L2_i$ logic element 81.

The incoming value on the $M2_i$ line is loaded into the M2 match register only f it is greater than the previous M2 value ($M2_o$). This is accomplished by input (1) of the $L2_i$ logic element 81, and is similar in operation to the negate flag.

The right flag provides a method for extending the concept of a variable-length care string in the search pattern, to allow a variable mix of several different specific characters, as the example shown in FIG. 9 illustrates. Suppose that the search pattern includes the name JEAN-PAUL. It is concluded that the hyphen may be replaced by a space, or a tab character, or some combination of these. Accordingly, the ideal search pattern would find a match if the data stream included any combination, up to a specified count, of several specified characters; for example, any five characters including hyphens, spaces and tabs, but no other characters. The right flag permits this function to be performed.

The search pattern stored in JEAN[-t]PAUL, where [is a cell with the bracket flag set, t is a tab character, and ] is a cell with the right flag set. The first segment of the pattern (JEAN) generates a match value in the M1 match line in the normal manner. Then the bracket cell copies this value in the M2 match line. For the next cells, following the bracket, the tolerance register is set to one, so the search for the characters following the bracket requires an exact match of one of the selected characters between the bracket and the cell with its right flag set. The cell containing the hyphen has both the OR flag and the choose flag set. The OR flag results in the $M1_i$ value being transferred to M3 and the $M2_i$ value being copied to M1. Then the choose flag in the same cell chooses the larger of the M3 and M1 values. The next cell, contaiing the tab characters, also has its OR and choose flags set and operates in the same manner as the preceding cell. Up to this point, the search pattern is quite similar to the one used in a common-prefix logical OR search. A non-zero output will be generated on the M1 match line if any one of the three charactes is detected.

The next cell, with the right flag set, may be though of as a "closing bracket." If the input of the M2$_i$ line is non-zero, indicating a prefix match, the counter is loaded with the length register value. If the M1$_i$ line also indicates a match, meaning that one of the three designated characters followed the prefix, then the M2 match value is recirculated and is also transferred to the M1 match line for use in matching the suffix pattern segment. If the M1$_i$ line indicates no match, i.e. that a character other than one of the specified three followed the prefix, then the M2 value is decremented by one, recirculated, and also transferred to the M1 match line.

So long as each character following the first pattern segment is one of the designated characters, and the number of such following characters does not exceed the designated count, then the cell with the right flag will continue to generate a match indicator. If a different character is interposed in the stream, or if the count is decremented to zero, the tolerance value will be decremented and the cell output may indicate a non-match.

Operations involving the right flag may also be better understood by tracing the relevant portions of logic in FIG. 3. Counter loading is initiated by the first load condition in the counter logic. The transfer of non-zero M2 tolerance value back to the M1 match line in a right-flag cell, is effected by input (2) of the L1$_i$ logic element, which is the selected input when M2$_i$ is non-zero.

After the counter has been loaded, the M1$_i$ line should normally return to zero, and the counter will be decremented on each cycle. The M1 register will then derive its input from the M1$_i$ line rather than the M2$_i$ line, as indicated by input (3) of the L1$_i$ logic element.

In the right-flag cell, the M2 match output, on line M2$_o$ is always transferred to the M1$_o$ line, through input (1) of the L1$_o$ logic element 85. The value of the output transferred is determined by the condition of the M1 match register 87 (M1$_a$) and by the condition of the counter. If M1$_a$ or the counter is zero, this indicates that either there is no current match within the brackets, or the match result in M2 has been output to M1 more than a selected number of times. In either case, the M2 match value is decremented prior to its next output on the M1$_o$ line. If M1$_a$ is non-zero, meaning that a matching character was found between the brackets, and the counter is non-zero, then the M2 match value is recirculated without change in the M2 line.

The recirculation of M2 values in a right-flag cell is effected through input (4) of the L2$_i$ logic element 81. Decrementing the M2 value is accomplished by the decrementing circuit 93, which is selected by input (2) of the L2$_o$ logic element 84.

Initialization and Diagnostic Mode:

It has been assumed in the foregoing examples that a mechanism exists for loading a number of serially connected cells with a desired search pattern, together with the associated flags and registers. The initialization scheme is discussed in Part B of this specification.

PART B

Details of Match Control Logic:

The logical functions for the logic 80, 81, 82, 83, 84, 85, and 86 are described in the following diagrammatic charts, designated CHART-1 through CHART-10. The following symbols are used in the charts:

TOL = tolerance value,

-continued

O = OR flag,
R = right flag,
N = negate flag,
C = choose flag,
P = pass flag,
L = last flag,
B = bracket flag
I = infinity flag,
K = counter,
Char = character register,
Patt = pattern register,
. = logical AND,
+ = logical OR.

The first three charts concern control of the counter in each cell. The counter is conventional in design, and operates in one of three modes: clear, load and decrement. As CHART-1 shows, the clear mode is entered only when a cmode signal is not asserted, which is when the cell is not in a search mode.

CHART-1 (CLEAR)

cmode

Whenever "cmode" is not negated, that is, "cmode" is asserted, the control logic 222 (FIG. 3) controls the counter to either be in the LOAD mode or in the DECREMENT mode. The initial value K in the counter is loaded from the length register 215. The loading of the count from register 215 is under control of the counter control 222, which receives a 2-bit TOL value from the tolerance register 217. The tolerance can have a value between zero and three indicated by the binary values of 00, 01, 10, and 11. The counter control 222 also receives the flags from the flag register 216.

The counter control 222 also receives the M1$_i$ and the M2$_i$ match lines. Each of the match lines M1$_i$, M2$_i$, M3$_i$, and M4$_i$, which are collectively referenced as (M1-M4)$_i$, are 2-bit lines. Each 2-bit line can represent the four different values from zero to three, which in binary notations are 00, 01, 10, and 11.

The logical combination of the inputs to the counter control 222 that cause the LOAD mode to be asserted are presented in the following CHART-2.

CHART-2 (LOAD)

$((R+N+O).(M1_i \neq 0)+(R+N+O).(M1_i \neq 0)+ \cdot (TOL \neq )).(cmode)$

Note from CHART-2 that the LOAD mode is asserted only when cmode is asserted. If the LOAD mode is not asserted, then the counter is decremented under the conditions set forth in the following CHART-3.

CHART-3 (DECREMENT)

$(K \neq 0).(\overline{LOAD}).(\overline{I}).(cmode)$

The counter, under control of the counter control 222 enables use of a character count during various search operations.

In FIG. 3, the pattern register 218 stores the character pattern that is to be searched for by the FIG. 3 cell. The mask register 219 stores a mask, which permits any combination of the bits in the pattern register 218 to be ignored. The contents of the pattern register 218 and the mask register 219 are logically ORed together in the comparator 220, before comparson with the contents of the character register 214.

Whenever the contents of character register 214 are the same as the contents of the pattern register 218, ignoring any bits masked by the contents of mask register 219, the comparator 220 provides a comparison signal, which provides input (1) to the $M1_f$ logic element 83.

The logical relationships governing the logic elements shown in FIG. 3 are given in CHART-4 through CHART-10 below.

CHART-4 ($L1_i$)

| No. | Name | Logic |
|---|---|---|
| (1) | TOL | $TOL \neq 0$ |
| (2) | $M2_i$ | $(\underline{O}).(K \leqq 1 + M2_i > M1_f) + (R).(M2_i \neq 0)$ |
| (3) | $M1_i$ | $(O).(K \leqq 1 + M1_i > M1_f) + R + N + B$ |
| (4) | $M1_f$ | else |

CHART-5 ($L2_i$)

| No. | Name | Logic |
|---|---|---|
| (1) | $M2_i$ | $(R+N) \cdot (M2_i > M2_o)$ |
| (2) | 0 | $(N) \cdot (M1_i \neq 0)$ |
| (3) | $M2_i$ | $\overline{(R+N)}$ |
| (4) | $M2_o$ | else |

CHART-6 ($L1_f$)

| No. | Name | Logic |
|---|---|---|
| (1) | $M1_a - 1$ | $Char \neq Patt + K = 0$ |
| (2) | $M1_a$ | else |

CHART-7 ($L2_o$)

| No. | Name | Logic |
|---|---|---|
| (1) | $M1_a$ | B |
| (2) | $M2_a - 1$ | $(R).(M1_a = 0 + K = 0)$ |
| (3) | $M2_a$ | else |

CHART-8 ($L1_o$)

| No. | Name | Logic |
|---|---|---|
| (1) | $M2_c$ | $R + N$ |
| (2) | $M3_o$ | $(C).(P).(M3_o > M1_f) + (C).(\overline{P}).(M3_o > M1_b)$ |
| (3) | $M1_f$ | P |
| (4) | $M1_b$ | else |

CHART-9 ($L3_i$)

| No. | Name | Logic |
|---|---|---|
| (1) | $M1_i$ | O |
| (2) | $M3_i$ | else |

CHART-10 ($L4_o$)

| No. | Name | Logic |
|---|---|---|
| (1) | $M1_o$ | $(L).(M1_o > M4_a)$ |
| (2) | $M4_a$ | else |

The logic in each of the logic blocks 80 through 86 is conventional in implementation and is defined in the following manner. Each input to each logic block has a priority determined by its input number. Specifically, the input (1) has the highest priority, the input (2) has the next highest priority and so forth until the input (4) has the lowest priority. If the logical statement for the highest priority input is satisfied, then the value of the input listed in the NAME column has its value selected as the output from the logic block. If the (1) input is not satisfied for any logic block, then the next highest order input, namely the (2) input is examined and if the logic specified is satisfied, then the corresponding value of the input (identified in the NAME column) is provided at the output. This process continues until the highest order input is satisfied and, at the very least, the lowest order input is selected for the output.

By way of a specific example, reference is made to the $L1_i$ logic block 80. For the (1) input, the value of TOL is examined and if it is not equal to zero, then the 2-bit value of the TOL signal is stored into the M1 register 87. However, if the value of TOL is equal to zero, then the logical expression for the (2) input is examined. The logical expression for the (2) input requires the logical AND of the OR flag, with the condition that K be less than or equal to 1 or that $M2_i$ be greater than $M1_f$ or the logical AND of the Right flag, and the condition that $M2_i$ not equal to zero. If this condition is satisfied, then the 2-bit value of $M2_i$ is stored into the M1 register 87. If neither the (1) or (2) conditions are satisfied, then the third logical condition is examined as set forth in CHART-4 above. If this condition is satisfied, then the 2-bit value of $M1_i$ is stored into the M1 register 87. If none of the logical conditions for the (1), (2), or (3) inputs are satisfied, then the value of $M1_f$ output from the logic block 83 is stored into the M1 register 87.

Similar to logic block 80, each of the other logic blocks 81 through 86 in FIG. 5 processes the inputs in the priority fashion indicated to provide 2-bit output.

The Fast Data Finder (FDF) processor is designed to do pattern mathcing particularly in a text search application. A simple pattern matching task might be: Fing the string "RED" within the text "THE SCHOOLS WERE RED..."

The FDF processor utilizes a pipeline or systolic approach consisting of N "cells" serially connected output to input. Typically, each cell in the pipeline is identical to all other cells in the pipeline. Each cell is programmed to search for a specific character. For example, to find the string "RED" three cells are used with the first one programmed with the character "R", the second one with the character "E", and the third one with the character "D".

Communication between cells in very simple. A text character enters each cell on the character line, CHAR. In addition, there are four lines that contain match information, namely M1, M2, M3 and M4. There is also a mode line, INIT, to indicate "initialization" or "compare" mode. Each cell receives information from the cell before it and passes information to the cell after it.

During the initialization mode, each cell is programmed with the specific pattern character in each cell. In addition to the pattern field, each cell has a length, eight flags, a mask and a tolerance field, which are also programmed during the initialization mode. These fields are used in the more complicated pattern matching cases.

After the initialization mode, the character comparison mode is entered. The text is streamed through the pipeline of cells. Each character of the text is compared with the first cell's pattern to form match information and this match information is passed to the second cell. The second cell's pattern is also compared with the next character of the text and the match information passed to the third cell. At the end of the pipeline, the output match information is checked to determine whether all N cells of the pattern have matched.

The text search functions handled by the FDF processor include:

1.0 SIMPLE search: example - "RED"
2.0 FIXED LENGTH DON'T CARES (FLDC): example -"FIRST" followed by exactly 5 characters followed by "WEEK"
3.0 VARIABLE LENGTH DON'T CARES (FLDC): example - "WAY" within 0 to 20 characters of "BLUE"
4.0 VARIABLE LENGTH CARES (VLC): example - "YIPPEE"and "YAHOO" separated by up to 3 "!"s
5.0 OR FUNCTION: example - "DOUG" or "KWANG-I"
6.0 RANGES OF STRINGS: example - "WR" followed by ")" or "I" followed by "TE"
7.0 CHOICE OF VARIABLE LENGTH CARE CHARACTERS: example - "YIPPEE" and "YAHOO" separated by up to 3 "!"s or "e"s
8.0 AND FUNCTION: example - "HAWAII" and "MAUI" before "MOLO"
9.0 NUMERIC RANGING: example - Numbers between 1.08 and 1200.43

Each of these search functions is described in detail including information needed to initialize the cells as well as an explanation of the matching.

1.0 SIMPLE SEARCH

In the example mentioned above, a search is made for the string "RED" in the text string, "THE SCHOOL IS RED . . . ".

Initialization Mode. In the Simple search, the processor is initialized as follows:

1. Pattern -- character to match
2. Mask -- bits to ignore
3. Tolerance -- initial match value, decremented when mismatches occur
4. Last flag -- indicates last cell of pattern In the example the first cell, $c_1$, is initialized to contain the pattern "R", the second cell, $c_2$, to contain the pattern "E" and the third cell, $c_3$, to contain the pattern "D". Since the cells compare on a bit-by-bit basis, a mask in each cell allows for specified bits to be ignored. In our example, we want to look for an upper or lower case "R", so we set the mask accordingly. The tolerance is set to 0 in every cell except the first, which is set with a tolerance of 1. Since the third cell, $c_3$, is the last cell of our pattern, it must be programmed with the last flag turned on. The results of initialization appear in the following TABLE 1—1.

TABLE 1-1
SIMPLE INITIALIZATION

| | $c_1$ | $c_2$ | $c_3$ | $c_4$ | . . . | $c_N$ |
|---|---|---|---|---|---|---|
| PATTERN | R | E | D | | | |
| MASK | U | U | U | A | . . . | A |
| TOLERANCE | 1 | 0 | 0 | 0 | . . . | 0 |
| LAST FLAG | OFF | OFF | ON | OFF | . . . | OFF |

The symbol U in the mask designation means that the mask has one bit set so as to ignore the difference between upper-case and lower-case characters. The symbol A means that all bits of the mask are set.

Matching Mode. After initialization, the text string is fed into the pipeline. The M1 value of cell c is set to the cell's tolerance if c's tolerance is nonzero. Otherwise, M1 is set to the incoming M1 value. As each test character enters the pipeline, it is compared with the pattern in the cell. If the incoming character and stored pattern do NOT compare, the match is decremented by one. At the next stage, this M1 value is left in the delay register, while the delay value is carried by M1 to the next cell. Thus, the delay register is nonzero only if the previous character matched this cell's pattern. For cells with the last flag set, the delay register value is placed in M4. M4 otherwise passes directly to the next cell.

In this example, the $c_1$ tolerance value is a 1, and at $c_1$ the M1 value will, therefore, always be set to a 1. The first character "T", of the text string, "THE SCHOOLS WERE RED . . . " does not match $c_1$'s pattern "R", causing the M1 value to be decremented to 0. Subsequently, the delay register becomes zero and a zero is passed to $c_2$. The second character "H", of the text string also causes the same thing to happen and in a similar manner M1 and delay remain 0 until the "R" in "RED" enters the processor. The status of the character, match, and delay registers is given in the following TABLE 1-2.

TABLE 1-2

| STAGE 0 | | | | | | | |
|---|---|---|---|---|---|---|---|
| $c_1$ | | $c_2$ | | $c_3$ | | $c_4$ | |
| character | | character E | | character R | | character E | |
| M1 | delay | M1 | delay | M1 | delay | M1 | delay |
| 0 | 0 | 0 | 0 | 0 | 0 | 0 | 0 |

Now the "R" enters the FDF. As always, M1 is set to the tolerance, but since the "R" DOES match $c_1$'s pattern, the M1 value of 1 is unmodified. The delay register picks up the M1 value of 0 of the previous stage.

TABLE 1-3

| STAGE 1 | | | | | | | |
|---|---|---|---|---|---|---|---|
| $c_1$ | | $c_2$ | | $c_3$ | | $c_4$ | |
| character P | | character | | character E | | character R | |
| M1 | delay | M1 | delay | M1 | delay | M1 | delay |
| 1 | 0 | 0 | 0 | 0 | 0 | 0 | 0 |

The "E" now enters the pipeline. Again, M1 is set to the tolerance, but the E does not match the pattern "R", so the M1 value is decremented to 0. The M1 is left in the delay register while the second cell receives the delay value of $c_1$.

TABLE 1-4

| STAGE 2 | | | | | | | |
|---|---|---|---|---|---|---|---|
| $c_1$ | | $c_2$ | | $c_3$ | | $c_4$ | |
| character E | | character R | | character | | character E | |
| M1 | delay | M1 | delay | M1 | delay | M1 | delay |
| 0 | 1 | 0 | 0 | 0 | 0 | 0 | 0 |

The "D" now enters the FDF. Again, $c_1$'s M1 value is decremented to 0. The "E" moves into $c_2$'s character register, while $c_2$'s match register is set to the 1 in $c_1$'s delay register. Since the "E" matches $c_2$'s pattern of "E", this 1 remains unmodified. The "R" moves into $c_3$'s character register and the other registers are set to 0.

TABLE 1-5

| STAGE 3 | | | | | | | |
|---|---|---|---|---|---|---|---|
| $c_1$ | | $c_2$ | | $c_3$ | | $c_4$ | |
| character | | character D | | character E R | | character | |
| M1 | delay | M1 | delay | M1 | delay | M1 | delay |
| 0 | 0 | 1 | 0 | 0 | 0 | 0 | 0 |

At the next step, the "." enters the pipeline. None of the text string characters match the pattern of the cell they are occupying. The M1 values move into the delay registers without modification.

TABLE 1-6

| STAGE 4 | | | | | | | |
|---|---|---|---|---|---|---|---|
| $c_1$ | | $c_2$ | | $c_3$ | | $c_4$ | |
| character | | character D | | character E | | character R | |
| M1 | delay | M1 | delay | M1 | delay | M1 | delay |
| 0 | 0 | 0 | 1 | 0 | 0 | 0 | 0 |

The "D" now moves into the third cell, where it matches the pattern. The M1 value is not decremented.

TABLE 1-7

| STAGE 5 | | | | | | | |
|---|---|---|---|---|---|---|---|
| $c_1$ | | $c_2$ | | $c_3$ | | $c_4$ | |
| character | | character | | character D | | character E | |
| M1 | delay | M1 | delay | M1 | delay | M1 | delay |
| 0 | 0 | 0 | 0 | 1 | 0 | 0 | 0 |

Finally, the first "." moves into the third cell, where $c_3$'s delay gets the M1 value of 1. Since the last flag is set, the M4 value is set to the delay value of 1. Thus, the final match value of 1 is carried on the M4 line and moves through the pipeline with the first ".", the character following "RED".

TABLE 1-8

| STAGE 6 | | | | | | | |
|---|---|---|---|---|---|---|---|
| $c_1$ | | $c_2$ | | $c_3$ | | $c_4$ | |
| character . | | character . | | character . | | character D | |
| M1 | delay | M1 | delay | M1 | delay | M1 | delay |
| 0 | 0 | 0 | 0 | 0 | 1 | 0 | 0 |
| M4 0 | | M4 0 | | M4 0 | | M4 0 | |
| MATCH FOUND!!! | | | | | | | |

The flow of information is summarized in the following table. Each O or X represents one register in the cell. At the first cell, M1 is set to the tolerance value. M1 passes through the delay register at each character of the pattern. At the third cell, with the last flag set, M1 moves down to the M4 RESULT line.

TABLE 1-10

| R E D | | | | | | | | |
|---|---|---|---|---|---|---|---|---|
| M1 | X X | X X | X X | 0 0 | 0 0 | 0 0 | 0 0 | 0 0 |
| M2 | 0 | 0 | 0 | 0 | 0 | 0 | 0 | 0 |
| M3 | 0 | 0 | 0 | 0 | 0 | 0 | 0 | 0 |

TABLE 1-10-continued

| R E D | | | | | | | | |
|---|---|---|---|---|---|---|---|---|
| M4 | 0 | 0 | 0 | X | X | X | X | X |

2.0 FIXED LENGTH DON'T CARE (FLDC) SEARCH

The mask allows for specified bits of the pattern to be ignored in the comparison. If all of the bits are "masked out", every text character will "match" the pattern. This allows us to find, for example, "FIRST" followed by exactly five characters followed by "WEEK".

Initialization Mode. The initialization is identical to the SIMPLE Search, except for the mask, where all bits masked are represented by an "A" as shown in the following TABLE 2-1.

TABLE 2-1

| RESULTS OF INITIALIZATION | | | | | | | | | | | | | | |
|---|---|---|---|---|---|---|---|---|---|---|---|---|---|---|
| | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ |
| PAT. | F | I | R | S | T | * | * | * | * | * | W | E | E | K |
| MASK | U | U | U | U | U | A | A | A | A | A | U | U | U | U |
| TOL. | 1 | 0 | 0 | 0 | 0 | 0 | 0 | 0 | 0 | 0 | 0 | 0 | 0 | 0 |
| LAST | 0 | 0 | 0 | 0 | 0 | 0 | 0 | 0 | 0 | 0 | 0 | 0 | 0 | 0 |

Matching Mode. Identical to SIMPLE CASE.

3.0 VARIABLE LENGTH DON'T CARE (VLDC)

Suppose we want to search for "WAY" within 0 to 20 characters of "BLUE". We use one cell to handle the VLDC with the length set to 21, which s placed between "WAY" and "BLUE".

Initialization Mode. In the VLDC case, we must initialize the following.
1. Pattern
2. Mask
3. Tolerance
4. Last flag
5. Length -- initial counter value, decremented with each character, reset with incoming match
6. Pass -- bypasses the delay when set.

The length is set to 1 on all cells except the fourth, which is set to 21. Cell $c_4$ also has the pass flag set, since we also want to be able to find 0 characters between "WAY" and "BLUE". Notice that cell $c_4$ also has all bits masked.

TABLE 3-1

| RESULTS OF INITIALIZATION | | | | | | | | |
|---|---|---|---|---|---|---|---|---|
| | $c_1$ | $c_2$ | $c_3$ | $c_4$ | $c_5$ | $c_6$ | $c_7$ | $c_8$ |
| PATTERN | W | A | Y | * | B | L | U | E |
| MASK | U | U | U | A | U | U | U | U |
| TOLERANCE | 1 | 0 | 0 | 0 | 0 | 0 | 0 | 0 |
| LENGTH | 1 | 1 | 1 | 21 | 1 | 1 | 1 | 1 |
| PASS | 0 | 0 | 0 | 1 | 0 | 0 | 0 | 0 |
| LAST FLAG | 0 | 0 | 0 | 0 | 0 | 0 | 0 | 1 |

Matching Mode. Table 3—3 illustrates the information flow. Tolerance moves into M1 at the first cell. The tolerance value in M1 passes through the delay to the subsequent cells, and then down to M4 at the last cell. The exception to this is at the fourth VLDC cell. Since the pass flag is set here, the delay is skipped and the M1 tolerance value passes directly to the subsequent cells.

The other new concept here is the length. When a nonzero M1 value enters the fourth cell, the length is loaded into the counter. The counter counts down to 0 (indicating that the selected number of characters have occurred since "WAY" was found) before the M1 value is decremented.

TABLE 3-2

Variable Length Don't Care (VLDC)
EXAMPLE: WAY within 20 characters of BLUE
PATTERN SETUP

| PATTERN | W | A | Y | * | B | L | U | E |
|---|---|---|---|---|---|---|---|---|
| MASK | U | U | U | A | U | U | U | U |
| TOL | 1 | 1 | 1 | 21 | 1 | 1 | 1 | 1 |
| LENGTH | 0 | 0 | 0 | 1 | 0 | 0 | 0 | 0 |
| LAST | 0 | 0 | 0 | 0 | 0 | 0 | 0 | 1 |

TABLE 3-3

WAY*BLUE

| | | | | | | | | | | |
|---|---|---|---|---|---|---|---|---|---|---|
| M1 | XX | XX | XX | X0 | XX | XX | XX | XX | 00 | 00 |
| M2 | 0 | 0 | 0 | 0 | 0 | 0 | 0 | 0 | 0 | 0 |
| M3 | 0 | 0 | 0 | 0 | 0 | 0 | 0 | 0 | 0 | 0 |
| M4 | 0 | 0 | 0 | 0 | 0 | 0 | 0 | 0 | X | X |

4.0 VARIABLE LENGTH CARE (VLC)

One may want to specify that only a specified character can be between our two strings. For example, "YIPPEE" and "YAHOO" separated by up to 3 "!"s.

Initialization Mode. Identical to the VARIABLE LENGTH DON'T CARE case except for the pattern and mask on the VLC cell. In this case, the seventh cell has a definite pattern of "!" and is not masked.

TABLE 4-1

RESULTS OF INITIALIZATION

| | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ |
|---|---|---|---|---|---|---|---|---|---|---|---|---|
| PATTERN | Y | I | P | P | E | E | ! | Y | A | H | O | O |
| MASK | U | U | U | U | U | U | N | U | U | U | U | U |
| TOL. | 1 | 0 | 0 | 0 | 0 | 0 | 0 | 0 | 0 | 0 | 0 | 0 |
| LENGTH | 1 | 1 | 1 | 1 | 1 | 1 | 3 | 1 | 1 | 1 | 1 | 1 |
| PASS | 0 | 0 | 0 | 0 | 0 | 0 | 0 | 0 | 0 | 0 | 0 | 0 |
| LAST | 0 | 0 | 0 | 0 | 0 | 0 | 0 | 0 | 0 | 0 | 0 | 1 |

Matching Mode. The seventh cell loads the length into its counter when "YIPPEE" has matched i.e. when a nonzero M1 tolerance value enters. It continues passing this value to the delay register as long as the counter remains nonzero AND the pattern and text character match. Note that in this case, the search will find "YIPPEE" within one "!" of "YAHOO", but cannot handle "YIPPEE" within zero characters of "YAHOO". The reason for this is that the "Y" of "YAHOO" will not match the "!" pattern of $c_7$.

TABLE 4-2

Variable Length Care (VLC)
EXAMPLE: YIPPEE with 3 !s of YAHOO
PATTERN SETUP

| PATTERN | Y | I | P | P | E | E | ! | Y | A | H | O | O |
|---|---|---|---|---|---|---|---|---|---|---|---|---|
| MASK | U | U | U | U | U | U | N | U | U | U | U | U |

TABLE 4-2-continued

Variable Length Care (VLC)
EXAMPLE: YIPPEE with 3 !s of YAHOO
PATTERN SETUP

| LENGTH | 1 | 1 | 1 | 1 | 1 | 1 | 3 | 1 | 1 | 1 | 1 |
|---|---|---|---|---|---|---|---|---|---|---|---|
| LAST | 0 | 0 | 0 | 0 | 0 | 0 | 0 | 0 | 0 | 0 | 1 |

TABLE 4-3

YIPPEE!YAHOO

| | | | | | | | | | | | | | |
|---|---|---|---|---|---|---|---|---|---|---|---|---|---|
| M1 | XX | XX | XX | XX | XX | XX | XX | XX | XX | XX | XX | XX | 00 |
| M2 | 0 | 0 | 0 | 0 | 0 | 0 | 0 | 0 | 0 | 0 | 0 | 0 |
| M3 | 0 | 0 | 0 | 0 | 0 | 0 | 0 | 0 | 0 | 0 | 0 | 0 |
| M4 | 0 | 0 | 0 | 0 | 0 | 0 | 0 | 0 | 0 | 0 | 0 | X |

5.0 "OR" FUNCTION

The FDF can also handle logical "OR" functions. An example might be to search for the names "DOUG" or "KWANG-I".

Initialization Mode. In the "OR" case, we must initialize the following:
1. Pattern
2. Mask
3. Tolerance
4. Last flag The "OR" case is initialized as in the SIMPLE case, with the individual strings concatenated. Thus, "DOUG" and "KWANG-I" are each initialized as in the simple case, and then concatenated so that eleven FDF cells are used. The first four cells are initialized with "DOUG", while cells five through eleven contain the pattern "KWANG-I". As in the SIMPLE case, the first and fifth cells have tolerances of 1. Cells $c_4$ and $c_{11}$ have the last flag set.

TABLE 5-1

RESULTS OF INITIALIZATION

| | $c_1$ | $c_2$ | $c_3$ | $c_4$ | $c_5$ | $c_6$ | $c_7$ | $c_8$ | $c_9$ | $c_{10}$ | $c_{11}$ |
|---|---|---|---|---|---|---|---|---|---|---|---|
| PATTERN | D | O | U | G | K | W | A | N | G | — | I |
| MASK | U | U | U | U | U | U | U | U | U | N | U |
| TOL. | 1 | 0 | 0 | 0 | 1 | 0 | 0 | 0 | 0 | 0 | 0 |
| LAST | 0 | 0 | 0 | 1 | 0 | 0 | 0 | 0 | 0 | 0 | 1 |

Matching Mode. The following table (5-3) illustrates the flow of information. The tolerance is introduced into M1 at the first and fifth cells. Character comparisons of the text against the pattern occur at each cell, with mismatches causing the M1 value to be decremented by 1. M1 again passes through the delay register, and continues on the M1 line until encountering a cell with the last flag set (.e.g the fourth and eleventh cells). At cells $c_4$ and $c_{11}$, the M1 value passes to M4. The "best" accomplished by comparing M1 and the incoming M4 and keeping only the larger value.

TABLE 5-2

OR
EXAMPLE: DOUG OR KWANG-I
PATTERN SETUP

| PATTERN | D | O | U | G | K | W | A | N | G | — | I |
|---|---|---|---|---|---|---|---|---|---|---|---|
| MASK | U | U | U | U | U | U | U | U | U | U | U |
| TOL | 1 | 0 | 0 | 0 | 1 | 0 | 0 | 0 | 0 | 0 | 0 |
| LAST | 0 | 0 | 0 | 1 | 0 | 0 | 0 | 0 | 0 | 0 | 1 |

TABLE 5-3

DOUGKWANG-I

| | | | | | | | | | | | | |
|---|---|---|---|---|---|---|---|---|---|---|---|---|
| M1 | XX | XX | XX | XX | XX | XX | XX | XX | XX | XX | XX | 00 | 00 |

TABLE 5-3-continued

|    | D | O | U | G | K | W | A | N | G | - | I |   |   |
|----|---|---|---|---|---|---|---|---|---|---|---|---|---|
| M2 | 0 | 0 | 0 | 0 | 0 | 0 | 0 | 0 | 0 | 0 | 0 | 0 | 0 |
| M3 | 0 | 0 | 0 | 0 | 0 | 0 | 0 | 0 | 0 | 0 | 0 | 0 |   |
| M4 | 0 | 0 | 0 | 0 | X | X | X | X | X | X | X | X | X |

6.0 RANGES OF CHARACTERS OF STRINGS

Suppose one wants to find either the string "WRITE" or the string "WROTE". This could be handled as an "OR" function as illustrated above, using ten cells. However, the number of cells can be greatly decreased. The pattern is set up as "WR" followed by "I" or "O" followed by "TE". The three additional flags needed are the bracket, choose, and or flags.

Initialization Mode. To detect either the "I" or "O" (following the "WR") the or flag is set in the "O" cel. Surrounding the "I" or "O" cells are extra cells with the bracket flags set. The "O" cell must also have the choose flag set.

The flags needed for the RANGES case are:
1. Pattern
2. Mask
3. Tolerance
4. Last
5. Pass -- bypasses the delay; always set with the bracket flag
6. Bracket -- encloses the alternative strings
7. Or -- indicates new alternative; set on first character of second and subsequent. alternative string
8. Choose -- indicates last cell of alternative; set on last character of second and subsequent alternative strings

TABLE 6-1

| RESULTS OF INITIALIZATION |       |       |       |       |       |       |       |       |       |          |          |
|---------------------------|-------|-------|-------|-------|-------|-------|-------|-------|-------|----------|----------|
|                           | $c_1$ | $c_2$ | $c_3$ | $c_4$ | $c_5$ | $c_6$ | $c_7$ | $c_8$ | $c_9$ | $c_{10}$ | $c_{11}$ |
| PATTERN                   | W     | R     | [     | I     | O     | ]     | T     | E     |       |          |          |
| MASK                      | U     | U     | A     | U     | U     | A     | U     | U     |       |          |          |
| TOL.                      | 1     |       |       |       |       |       |       |       |       |          |          |
| OR                        |       |       |       |       | 1     |       |       |       |       |          |          |
| BRACKET                   |       |       | 1     |       |       | 1     |       |       |       |          |          |
| PASS                      |       |       | 1     |       |       | 1     |       |       |       |          |          |
| CHOOSE                    |       |       |       |       | 1     |       |       |       |       |          |          |
| LAST                      |       |       |       |       |       |       |       | 1     |       |          |          |

Matching mode. As in the other cases, M1 carries current "match" information, while M4 carries the final "result" information. In addition, however, there are two other match information lines: M2 and M3. These lines are also used to store match information. The M2 line holds information about partial matches before the bracket cell. The M3 line holds information about partial matches within the bracket cells. The M2 information can be used within the bracket cells, so that the M3 holds information about the match both outside and inside the brackets.

At the bracket cell, the M1 tolerance value is placed into M2. The pass flag is always set in a bracket cell, so the delay register is bypassed. Note that this is an important function for the "opening bracket." However, it is not necessary for the "closing bracket." In fact, there is no need for the "closing bracket" at all, but it is included for visual symmetry.

At the OR cell, $c_5$, one necessary function is to retrieve the match information that was derived before the bracket cell, and then to continue comparisons. Thus, at an OR cell, the M2 value is loaded into M1, and comparisons continue. Also, the M1 value is placed into M3, so that M3 contains information about the partial "match" within the bracket cells.

In order to detect the "best" match within the bracket cells, the choose flag is used. When the choose flag is set, the cell "chooses" the larger of the incoming M3 value and the M1 delay resister value. The chosen value is then sent to the next cell on the M1 line. The choose flag is set on the last character of the second and subsequent strings inside the bracket cells. Since the second string in this case is a single character, an 'O', the choose flag as well as the OR flag is set in the 'O' cell.

TABLE 6-2

| RANGES of characters or strings EXAMPLE: WRITE OR WROTE WR followed by I or O followed by TE. PATTERN SETUP | | | | | | | |
|---|---|---|---|---|---|---|---|
| PATTERN | W | R | [ | I | O | ] | T | E |
| MASK    |   |   |   | A |   | A |   |   |
| OR      |   |   |   |   | 1 |   |   |   |
| BRACKET |   |   | 1 |   |   | 1 |   |   |
| CHOOSE  |   |   |   |   | 1 |   |   |   |
| LAST    |   |   |   |   |   |   |   | 1 |

TABLE 6-3

| W R [ I O ] T E |   |   |   |   |   |   |   |   |   |   |   |   |
|-----------------|---|---|---|---|---|---|---|---|---|---|---|---|
| M1 | X X | X X | X 0 | X X | X X | X 0 | X X | X X | 0 0 | 0 0 |
| M2 | 0   | 0   | X   | X   | X   | X   | 0   | 0   | 0   | 0   |
| M3 | 0   | 0   | 0   | 0   | X   | 0   | 0   | 0   | 0   | 0   |
| M4 | 0   | 0   | 0   | 0   | 0   | 0   | 0   | 0   | X   | X   |

7.0 CHOICE OF VLC CHARACTERS

In the example illustrated in Tables 4-1 through 4-3, the goal was to find "YIPPEE" and "YAHOO" separated by up to 3 "!"s. Suppose, instead, that the goal is to find the same two strings, but separated by a choice of characters, e.g., "YIPPEE" and "YAHOO" separated by up to three "!" or "e"s. In this case, the search allows for any combination of "!" or "e"s adding up to three characters.

Initialization Mode. This initialization must include:
1. Pattern
2. Mask
3. Tolerance
4. Length
5. Or flag
6. Bracket flag
7. Choose flag
8. Last flag
9. Right flag -- "closing bracket" with a length set

TABLE 7-1

RESULTS OF INITIALIZATION

|  | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ |
|---|---|---|---|---|---|---|---|---|---|---|---|---|---|---|---|
| PATTERN | Y | I | P | P | E | E | [ | e | ! | ] | Y | A | H | O | O |
| MASK | U | U | U | U | U | U | A | U | U | A | U | U | U | U | U |
| TOLERANCE | 1 |  |  |  |  |  |  | 1 | 1 |  |  |  |  |  |  |
| LENGTH | 1 | 1 | 1 | 1 | 1 | 1 | 1 | 1 | 1 | 4 | 1 | 1 | 1 | 1 | 1 |
| OR |  |  |  |  |  |  |  |  | 1 |  |  |  |  |  |  |
| BRACKET |  |  |  |  |  |  | 1 |  |  |  |  |  |  |  |  |
| CHOOSE |  |  |  |  |  |  |  |  | 1 |  |  |  |  |  |  |
| RIGHT |  |  |  |  |  |  |  |  |  | 1 |  |  |  |  |  |
| PASS |  |  |  |  |  |  | 1 |  |  |  |  |  |  |  |  |
| LAST FLAG |  |  |  |  |  |  |  |  |  |  |  |  |  |  | 1 |

Matching Mode. Again, the M2 match line is used to hold information about partial matches before reaching the bracket cell, $c_7$. At cell $c_7$, the M1 value moves to the M2 match line.

The tolerance is set to 1 on cells $c_8$ and $c_9$, in addition to cell $C_1$, causing M1 to load the nonzero tolerance in the cells. Thus, an exact match of either the "e" or the "!" is needed.

Again, the M3 line is used to hold information about partial matches within the bracket cells. The choose flag allows for the "best" match to be selected.

In this case, the "closing bracket" has the right flag, rather than the bracket flag set. This cell, $c_{10}$, also has a length of 4. When a nonzero M2 value enters cell $c_{10}$ (indicating that "YIPPEE" was found), the length is loaded into the counter. Then, as long as the incoming M1 value is nonzero (indicating either an "e" or an "!" was found), the M2 value is not modified. This M2 value is also passed to the next cell on the M1 line. The counter in cell $c_{10}$ continues to count down as long as the incoming M2 value is zero, AND the incoming M1 value is nonzero. When the counter counts down to 0, M2 is cleared to 0, and this 0 is passed to the next cell.

Note that cell $c_{10}$ must have a length set to one greater than the number of characters allowed between the two strings. Also, the right cell always looks at the incoming M1 value to make sure that there was a match within the brackets. Therefore, the strings inside the bracket must have the same number of characters, and must both be one character in length.

TABLE 7-2

CHOICE OF VLC CHARACTERS
EXAMPLE: YIPPEE within 3 e's or !'s of YAHOO

PATTERN SETUP

| PATTERN | Y | I | P | P | E | E | [ | e | ! | ] | Y | A | H | O | O |
|---|---|---|---|---|---|---|---|---|---|---|---|---|---|---|---|
| MASK | U | U | U | U | U | U | A | U | U | A | U | U | U | U | U |
| OR | 0 | 0 | 0 | 0 | 0 | 0 | 0 | 0 | 1 | 0 | 0 | 0 | 0 | 0 | 0 |
| BRACKET | 0 | 0 | 0 | 0 | 0 | 0 | 1 | 0 | 0 | 0 | 0 | 0 | 0 | 0 | 0 |
| CHOOSE | 0 | 0 | 0 | 0 | 0 | 0 | 0 | 0 | 1 | 0 | 0 | 0 | 0 | 0 | 0 |
| RIGHT | 0 | 0 | 0 | 0 | 0 | 0 | 0 | 0 | 0 | 1 | 0 | 0 | 0 | 0 | 0 |
| LAST | 0 | 0 | 0 | 0 | 0 | 0 | 0 | 0 | 0 | 0 | 0 | 0 | 0 | 0 | 1 |
| TOLERANCE | 1 | 0 | 0 | 0 | 0 | 0 | 0 | 1 | 1 | 0 | 0 | 0 | 0 | 0 | 0 |

TABLE 7-3

YIPPEE [e!] YAHOO

| M1 | X X | X X | X X | X X | X X | X X | X 0 | X X | X X | X 0 | X X | X X | X X | X X | X X | 0 0 |
|---|---|---|---|---|---|---|---|---|---|---|---|---|---|---|---|---|
| M2 | 0 | 0 | 0 | 0 | 0 | 0 | X | X | X | X | 0 | 0 | 0 | 0 | 0 | 0 |
| M3 | 0 | 0 | 0 | 0 | 0 | 0 | 0 | 0 | X | 0 | 0 | 0 | 0 | 0 | 0 | 0 |
| M4 | 0 | 0 | 0 | 0 | 0 | 0 | 0 | 0 | 0 | 0 | 0 | 0 | 0 | 0 | 0 | X |

8. NEGATION

The logical function "AND" only makes sense in a text search application in the form: string1 AND string2 BEFORE string3. Our example here is: "HAWAII" and "MAUI" before "MOLO". That is to say, "HAWAII" and "MAUI" and not "MOLO".

Initialization Mode. The initialization must include:
1. Pattern
2. Mask
3. Yolerance
4. Bracket
5. Last
6. Negation -- "closing bracket" indicating end of "negation" string

TABLE 8-1

RESULTS OF INITIALIZATION

|  | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ |
|---|---|---|---|---|---|---|---|---|---|---|---|---|---|---|---|---|
| PATTERN | H | A | W | A | I | I | [ | M | O | L | O | ] | M | A | U | I |
| MASK | U | U | U | U | U | U | A | U | U | U | U | A | U | U | U | U |
| TOLERANCE | 1 |  |  |  |  |  |  | 1 |  |  |  |  |  |  |  |  |
| BRACKET |  |  |  |  |  |  | 1 |  |  |  |  |  |  |  |  |  |
| PASS |  |  |  |  |  |  | 1 |  |  |  |  |  |  |  |  |  |
| NEGATION |  |  |  |  |  |  |  |  |  |  |  | 1 |  |  |  |  |
| LAST FLAG |  |  |  |  |  |  |  |  |  |  |  |  |  |  |  | 1 |

Matching Mode. The M2 match line holds information about partial matches occurring before the first bracket cell, $c_7$. Inside the bracket cells, match information is carried on the M1 line. At $c_{12}$ (negation flag is set), M2 is set to the incoming M2 value if it is nonzero. This M2 value is also sent to the next cell on the M1 line, as long as the incoming M1 value is 0. If the incoming M1 value is not 0 (indicating that "MOLO" was found), the M2 value is cleared to 0, and this 0 is then passed to the next cell.

Thus, as soon as the string "HAWAII" is found, $c_{12}$ holds the match information in M2 and sends this across the $c_{13}$ on the M1 line. This continues until the string "MOLO" is found. Then M2 is cleared to 0 and the process starts again. The final result is nonzero, then, if (1) "HAWAII" was found, (2) "MAUI" was found, and (3) "MOLO" was NOT found between "HAWAII" and "MAUI".

Figure 10:
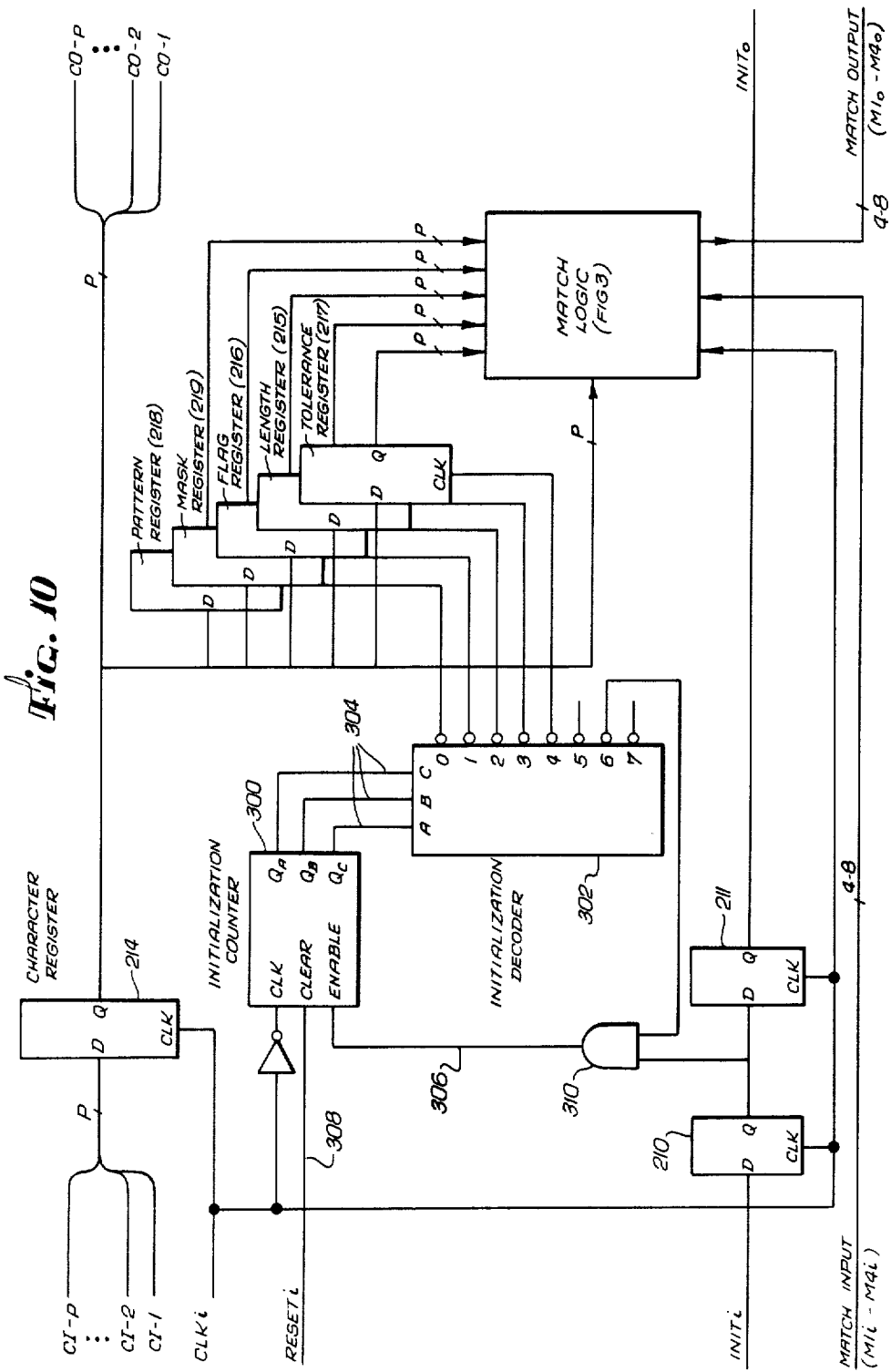
FIG. 10 is a block diagram showing the initialization logic for a search processor cell.

Initialization:

Initialization of the search cells is controlled by the initialization logic, which consists of a counter 300 and a decoder 302, as shown in FIG. 10. The counter 300 is of the synchronous binary type, with three bits of output, on lines 304, a separate count enable control on line 306, and a means for restarting the count from zero, on line 308. The binary counter value provides the input to the decoder 302 over lines 304. The first five outputs of the decoder, which are selected when the counter has a value between zero and four, form the clock lines for the five registers to be programmed during initialization. The sixth output is left unused so that external circuitry may be initialized on one of the initialization passes without affecting the cells. The seventh output is used to put the cell into search mode and to disable the counter, such that the seventh output remains enabled until the next reset cycle.

The initialization counter 300 clocks on the falling edge of a clock signal CLKI applied to the counter, but only when two conditions are met. The first condition is that the count has not yet reached seven, as discussed. The second condition is that, on the previous rising edge of CLKI, the INITI line was asserted. This is simply the output of a D flip-flop 210 in the INITI-INITO connection inside the cell. This flip-flop output is counted as one input of an AND gate 310, the other input being derived from the seventh output of the decoder 302. The output of the AND gate 310 is the enable line 306 of the counter 300.

As FIG. 10 also shows, the output of the character register 214 provides the data for loading into each of the registers during initialization. The output of the character register becomes valid after a rising edge of CLKI, and the initialization counter counts after a falling edge of CLKI (if INITI was previously asserted). As the initialization counter 300 counts, the output selected by the decoder is deselected, and this transition is used to store the output of the character register in one of the five registers to be initialized. Thus, the character input lines are used to provide the data that programs the cell during initialization.

The initialization cycle repeats with a reset of a cell or group of cells. A reset involves the momentary assertion of the RESETI line, causing the cell to assume a known initial state. The important feature of this state is the initialization counter restarting its count from zero.

Multiple Cell Initialization:

Groups of cells are formed by connecting the outputs of one cell to the inputs of the next, with the CLKI and RESETI signals shared among all cells in a group. The initialization scheme is designed so that any cell in the group can be programmed by manipulation of inputs to only the first cell, therefore requiring no extra lines to control and use a group of cells independently of the number of cells in the group.

This feature of the initialization scheme depends on the second D-type flip-flop 211 in the INITI to INITO connection in a cell. The presence of a second flip-flop causes the data that was present at the INITI line of the cell to appear on the INITO line after the second rising edge of CLKI. The data at the character input (CI) lines appears on the character output (CO) lines after the first rising edge of CLKI. Thus the INITI signal from one cell reaches the INITI of the next cell along with the second character given to the CI of the first cell. Similarly, the INITI signal would reach the third cell along with the third character given to the CI of the first cell.

Using the scheme, the initialization procedure for n cells can be outlined as follows:

1. Momentarily raise the RESETI signal.
2. Assert the INITI signal to the first cell.
3. Set the CI lines to the first cell to the value for the first register to be programmed in the first cell.
4. Raise and lower (pulse) the CLKI line. (On the first pass through these steps, this initializes the first register of the first cell.)
5. Deassert the INITI signal to the first cell.
6. Set the CI lines to the first cell to the data for the first register to be programmed in the second cell. (Initially, the decoder output #0 line will be asserted, and the first register of the second cell will be initialized.)
7. Pulse the CLKI line.
8. Repeat 6 and 7 for each of the n cells in the group.
9. Repeat 2, 3, 4, 5 now providing on the CI lines the data for the second register in the first cell.
10. Repeat 8 for each of the n cells in the group.
11. Repeat 9 and 10 for each register to be programmed.

In step 4, pulsing the clock signal causes the decoder 302 to advance from its first to its second output, thereby clocking data from the character register into the first register (the pattern register). Since the INITI signal is then deasserted (step 5), subsequent clock pulses do not affect the first cell. However, the INITI signal pulse is propagated from cell to cell, to effect initialization of the first register in each cell, as defined by steps 6, 7 and 8. to initialize the second register in each cell, the INITI signal is asserted again (step 2), and subsequent clock signals effect initialization of the second register.

Note that this initialization scheme is flexible in that it will allow the programming of any number of registers as exist in the cell without adding any additional lines for control or data. The only added complexity may be to increase the number of bits provided by the initialization counter 300 and decoder 302, both of which are internal to a cell.

After the last register is loaded during initialization, the cells are operated in a search mode. The INITI line is asserted a final time, and the first character of a stream of characters to be searched against the data stored in the cells is presented to the CI lines of the first cell in the group. The match input lines to the first cell are held at logical zero. The CLKI line is pulsed to clock the character into the cell's character register. The match logic compares the character with the pattern and produces a result on the match output lines. The second character is presented on the CI lines of the first cell, and the cycle repeats, with the first character and match output being loaded in the second cell on the same rising edge of CLKI which loads the second character. This cycle is repeated for every character to be searched. When the character and pattern match, the information is carried along the match output lines and is detected as a match when it appears at the last cell in the group, as described in the foregoing descriptive sections.

Interconnection of Cells:

The following sections describe the details of utilizing large numbers of cells to produce a data search system. The interconnection scheme presented here has several important features, beyond the basic ability to support large patterns. First, it provides the ability to break the cells into separate groups so that several independent patterns may be searched for in a single pass. Second, there is a provision to isolate small numbers of cells from the remainder of the system so that diagnostics may be performed in a more efficient way. Finally, the circuitry allows malfunctioning cells and interconnections to be bypassed so that isolated failures do not cause a total breakdown of the system.

The interconnection scheme divides a system containing cells into several distinct parts. First, several cells are interconnected to form a group of cells, consistent with the description in preceding sections. Groups of cells are interconnected to form a set of cells. Finally, several sets of cells are combined to form a system. The system is the unit that is connected to a host computer or input/output device. Each of these units are described in the following sections.

Figure 11:
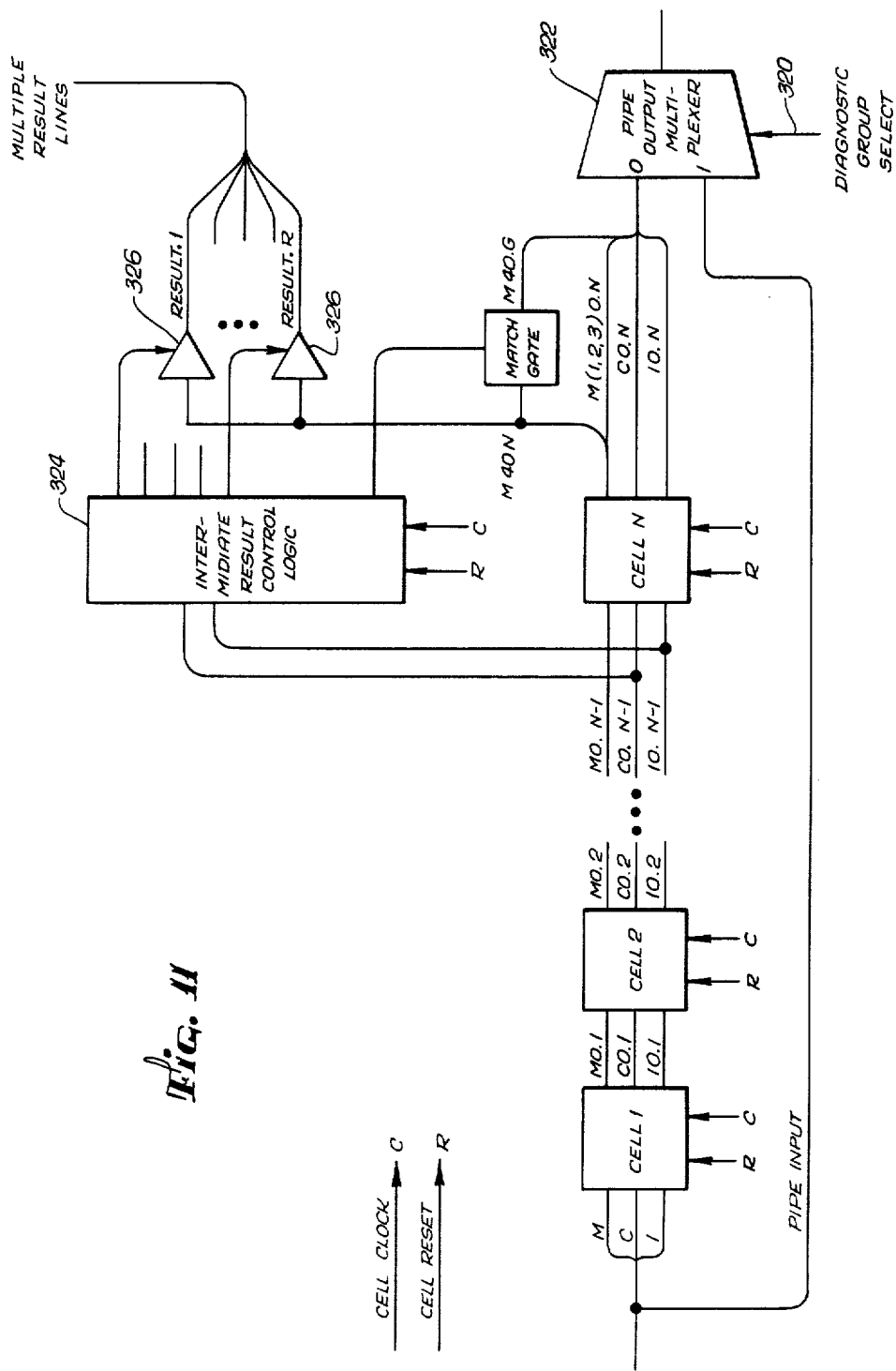
FIG. 11 is a block diagram showing the arrangement of multiple cells to form a group.

Interconnection of Cells into a Group:

FIG. 11 shows that in each group, N cells are connected such that the match, character, and initialization output lines of cell #n form the respective match, character, and initialization input lines of cell #n+1. The clock (CLKI) and reset (RESETI) lines are common for all cells in a group.

At the input to cell #1 and at the output of cell N the match, character, and initialization lines are conceptually combined into one line called the pipeline data path, or pipe. At the pipe output of each group is a two-input multiplexer, indicated at 322. When a diagnostic group select signal on line 323 is asserted, this multiplexer selects as the pipe output the pipe input, thus making the group transparent. Otherwise, multiplexer selects as the pipe output the output of cell #N, after processing by the intermediate result logic 324.

The intermediate result logic 324 is connected at cell N. The control logic monitors the character and initialization lines as output from cell N-1. During initialization this logic reads a field which is ignored by the cells and uses the information in the field to select one of several destinations for the search result at cell #N, or a continuation of the search into the next group. If the programmed destination is one of the multiple result lines, then the control logic enables a driver, indicated at 326, to place the contents of the $M4_o$ line from cell N onto the desired multiple result line. In addition, this $M3_o$ line is gated such that a null value is input to the multiplexer 322. However, if the intermediate results control logic 324 is programmed for continuation, $M4_o$ is transparently connected to the multiplexer 322, and all of the multiple result drivers 326 are disabled. Use of the multiple result lines is explained in the following descriptive section.

Figure 12:
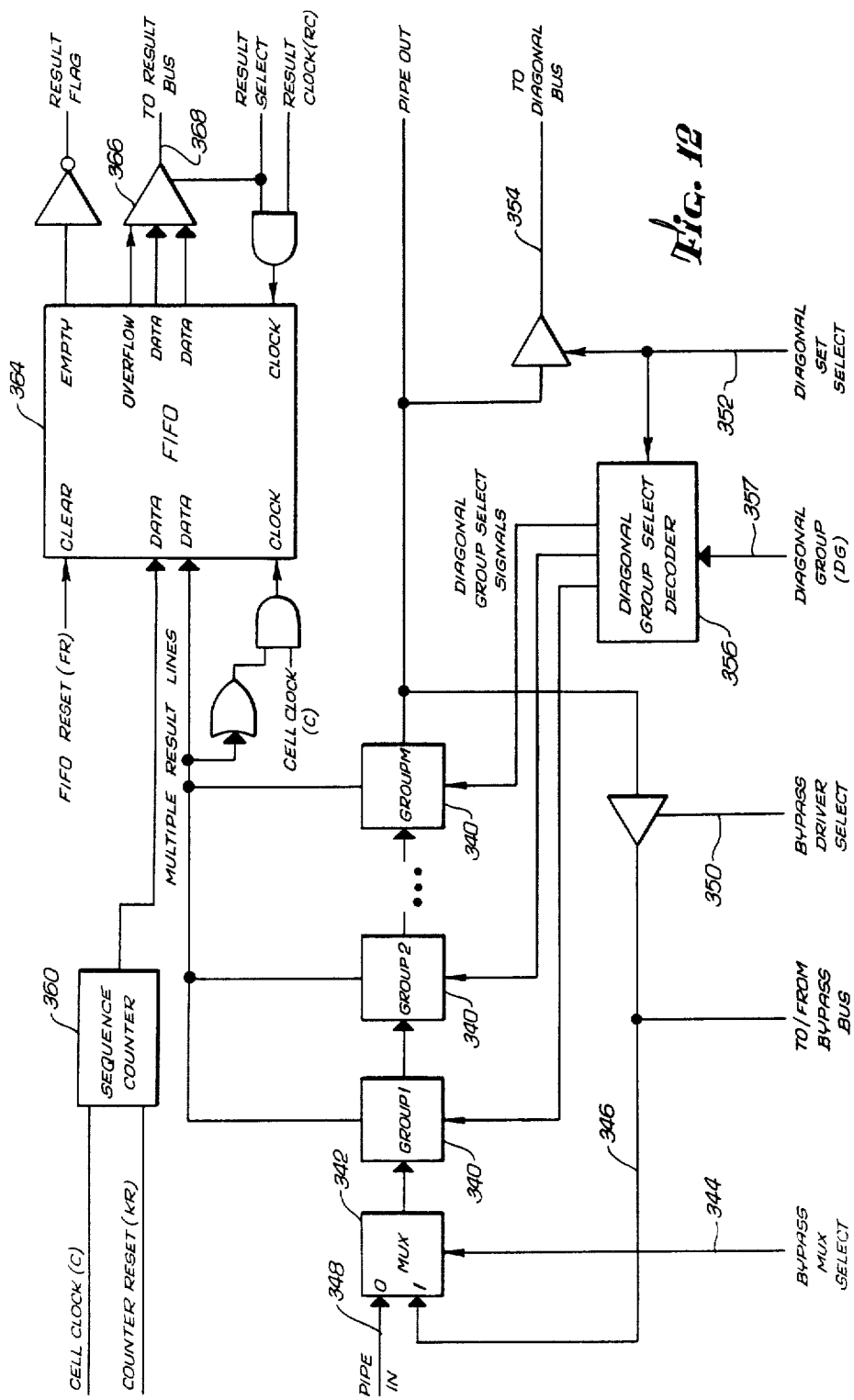
FIG. 12 is a block diagram showing the arrangement of multiple groups of cells to from a set.

Interconnection of Groups Into a Set:

FIG. 12 shows that in each set, M groups 340 are connected such that the pipe output of group #m is the pipe input of group #m+1. The input of group #1 comes from a two-input multiplexer 342. When a bypass mux select signal is asserted on line 344, the multiplexer 342 selects as the group #1 input a bypass bus 346. Otherwise, the multiplexer 342 selects a pipe input line 348 for input to group #1.

The pipe output is always the output of group #M. This output is also driven onto the bypass bus 346 when a bypass driver select signal is asserted on line 350. In addition, when a diagnostic set select signal is asserted on line 352, the output of group #M is driven onto a diagnostic bus 354.

The diagnostic set select signal also affects diagnostic group select logic 356, causing the assertion of diagnostic group select signals, on lines 324, for each group, and thus forcing the groups into the transparent mode. Selection of a group for diagnostic purposes is made by diagnostic group address lines 358 connected to the diagnostic group select logic 356, which is basically a decoder. If the diagnostic group line 357 indicates an address between 1 and M inclusive, the corresponding group is selected for diagnostic mode. Thus, if the diagnositc groupline has a valid address and diagnostic set select is asserted, all but one of the groups will be transparent.

In the set, a sequence counter 360 keeps track of the position in the data stream being searched. The sequence counter 360 is typically reset to its starting value after initializing is completed. It increments with the same clock that moves data through the cells along the character lines.

The set has R multiple result lines, each as wide (q bits) as an M4 line. The groups programmed to produce intermediate results each drive the contents of the $M4_o$ line onto a multiple result line. Typically the groups will be programmed such that the line choices are distinct. If no lines are shared, a maximum of R groups (out of the M in each set) may simultaneously produce intermediate results.

The information on the multiple result lines, together with the contents of the sequence counter and a field for status information, constitutes a match record. The match record, produced on every clock cycle during the search, reports the presence and accuracy of the pattern matching associated with each intermediate result. Each multiple result line that is not used will report a null field, as will each non-matching pattern. Reporting simultaneous matches on the same clock cycle is not a problem because a separate field is reserved for each intermediate result in use (i.e., for each pattern).

Each set has a FIFO (first-in-first-out) buffer memory 364 for temporary storage of match records. This memory is flushed when a FIFO reset signal is asserted. As each match record is produced during a search, the multiple result fields are analyzed by the clock-gating logic at the FIFO input. If all fields report null matches, the record is ignored, and is never stored. If at least one of the match record fields reports a successful match, the record is stored in the FIFO by enabling one clock pulse at the FIFO input. The FIFO is fast enough to store consecutive match records, but the throughput of match records is expected to be much less than the throughput of data in the pipe, because successful matches will occur infrequently enough that most match records will be ignored. The FIFO can be small, even smaller than the number of matches expected, because it is unloaded regularly during a search.

At the FIFO output, a driver 366 puts match records on a result bus 368. If the FIFO 364 cannot store an unexpectedly large burst of match records, it asserts an overflow signal. This signal is reported in the status field of the match record output, so that the host computer can detect the possibility of unreported matches. When the FIFO contains one or more match records (when the empty signal is not asserted), a result flag signal is asserted. When acknowledgment comes through an asserted result select signal, a record is unloaded from the FIFO by sending one pulse synchronized with the result clock signal to the FIFO output clock. Then the driver is enabaled to put the record on the result bus.

Figure 13:
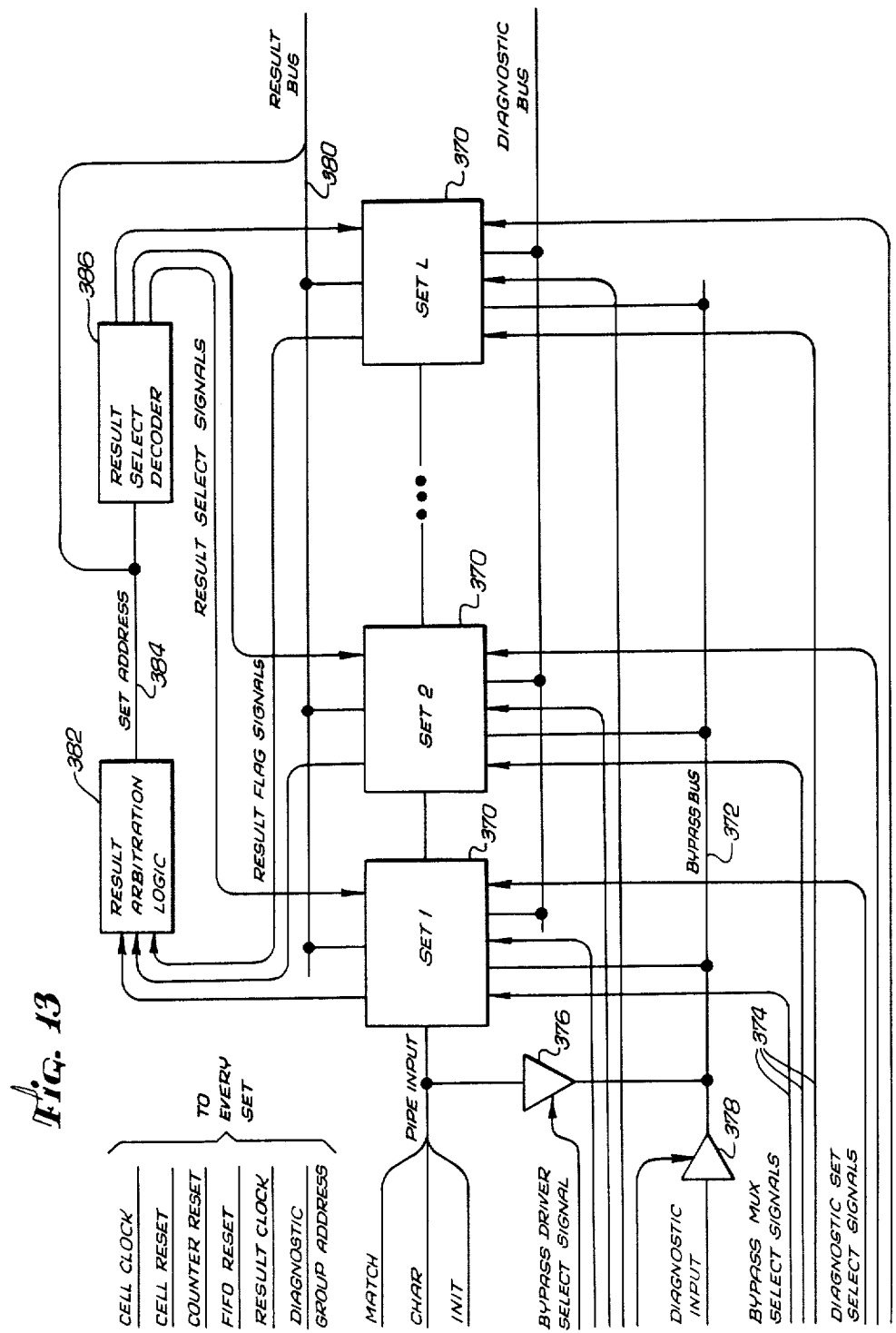
FIG. 13 is a block diagram showing the arrangement of multiple sets to form a system.

Interconnection of Sets into a System:

As FIG. 13 shows, in a complete FDF system, L sets 370 may be connected such that the pipe output of set #i is the pipe input of set #i+1. The input to set #1 is the input of the FDF system, whichc omes from a data source in the host system. The pipe output of the last set is unconnected.

A bypass bus 372 is an alternate path for pipe signals. At each set, the bypass bus 372 may be selected as input instead of the normal pipe input by the assertion of a bypass mux select line 374. The bypass mux select lines 374 originate at a control interface, under direct control of the host system. Several drivers on the bypass bus may transmit signals; but onlyone of these drivers may be enabled at a time. Each set has a bypass driver (not shown). An additional driver 376 from the system pipe input to the bypass bus 372 makes possible the isolation of set #1. One more driver 378 from the diagnostic input to the bypass bus 372 can feed pipe data into the system from the diagnostic interface. Each of these drivers is enabled by a bypass driver select line from the control interface.

Every set 370 in the system is connected to the result bus 380. This bus is wide enough to accomodate a match record with fields for sequence count, R intermediate resuls, and overflow status. Data transfers on this bus are synchronized by the result clock. The result arbitration and result select logic allow only one set to drive the result bus during each bus cycle. A set address field, recording the set of origin, is appended to the match record during each transfer on the result bus 380. Result arbitration logic 382 uses result flag signals to determine which sets, if any, have match records ready for transfer. The arbitration logic output, on a set address line 384, determines which set, if any, transfers a record during the next bus cycle. Result select logic 386 decodes a distinct result select signal for each set. If more than one result flag signal is asserted simultaneously, some sets may wait through several result bus cycles before the arbitration logic permits a bus transfer.

Figure 14:
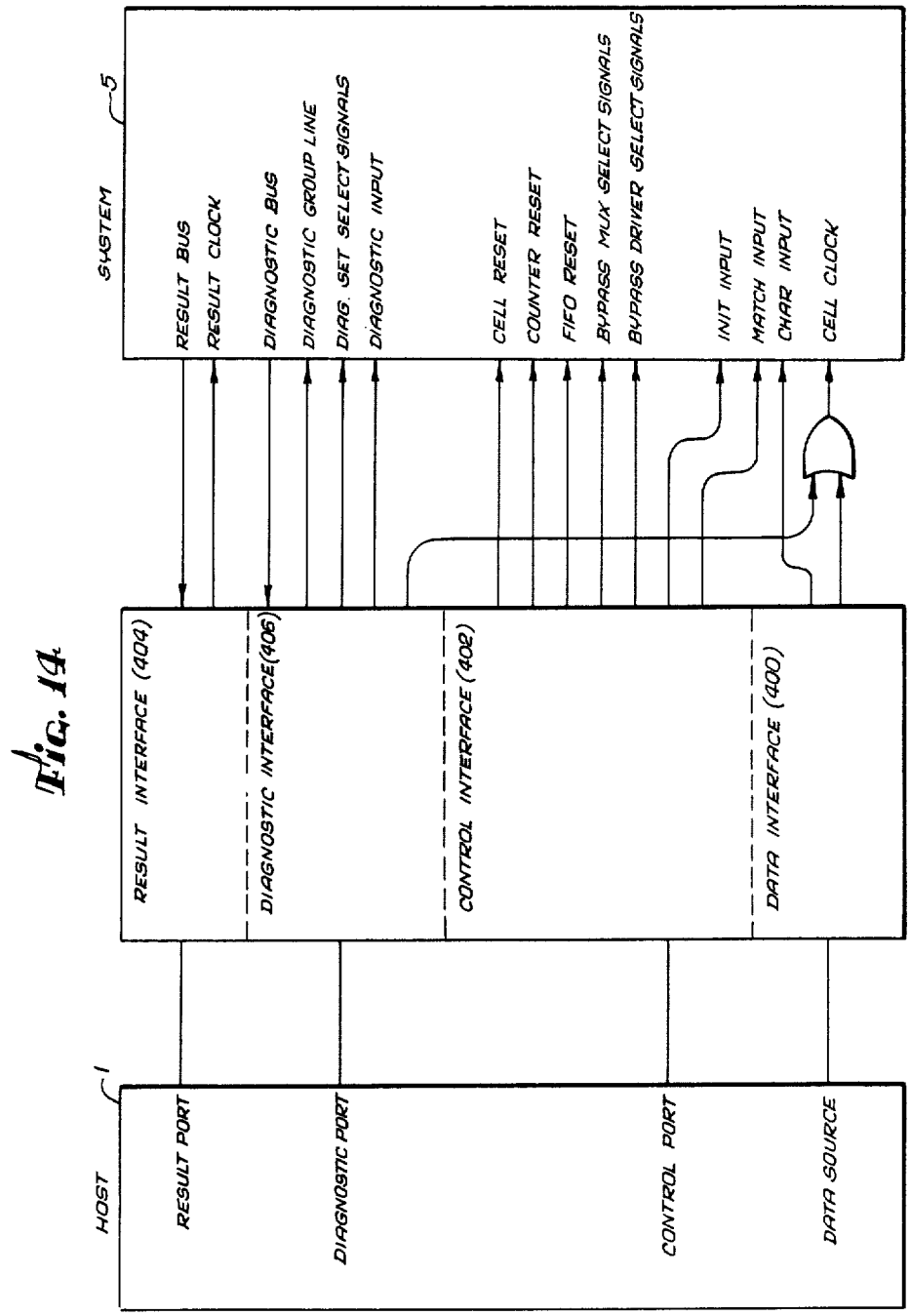
FIG. 14 is a block diagram showing the interface between a system and a host computer.

Interface to Host:

FIG. 14 shows that the FDF interface consists of a data interface 400, a control interface 402, a result interface 404, and a diagnostic interface 406. These interfaces provide communication between the host system 1 and the FDF 5. If the FDF system is designed to be usable with a variety of hosts, the FDF interface will contain the hostspecific system functions and will be significantly different in each implementation. It connects to whatever bus, port, or channel is available for efficient data transfer. In one application the host memory bus may provide sufficient speed and flexibility for all four interfaces; in another an output channel may be the data source for the data interface. For ideal performance the FDF interface could serve as a controller for a bank of streaming memory devices and then obtain source data without assistance from the host.

The data interface 400 is the high speed data path from the data sources in the host to the character line input of the FDF system. The cell clock signal is generated here during a speech.

The control interface 402 provides registers for host system control of several FDF internal signals. The match and initialization lines in the pipe input to the FDF typically have null values during a search, but other values may be specified in control interface registers. The INITI line is asserted during the initialization phase. The control interface separately controls the FDF system reset signals, namely, RESETI (cell reset), counter reset, and FIFO reset. Contents of other registers are decoded into the bypass driver select and bypass mux select signals. The bypass driver select signals are decoded so that only one driver may be enabled at a time, thus avoiding bus contention. The bypass mux select signals are not so restricted; several may be asserted at at ime if the application can use the resulting parallel pipeline configuration. For typical searching applications, however, only one of these signals will be asserted while bypassing a fault, and none otherwise.

The result interface 404 collects match records from the FDF system and transmits to the host for analysis. If the host cannot handle the peak rate of match record generation, records may be stored temporarily in the match result buffer memory until the host requests additional records.

The diagnostic interface 406 generates test signals for the diagnostic input line of the FDF. When complete testing cannot be accomplished by reading from the host's data source, a vector of test inputs loaded into a memory in the diagnostic interface can be read through the diagnostic input. This input can be directed to a particular set via the bypass bus by loading the bypass mux select register in the control interface. During such a test, the cell clock is generated in the diagonstic interface at a speed which may be different from the normal search speed. The output from the diagnostic bus is tested by signature analysis or by comparison with a vector of correct outputs, and the host is notified of the test outcome. The diagnostic interface can also tranmit the contents of the diagnostic bus directly to the host for analysis. A buffer similar to that of the result interface is available for temporary storage of diagnostic information. To isolate one particular set or group for testing, the host loads registers in the diagnostic interface with the diagnostic group and diagnostic set addresses. The diagnostic group line is connected directly to each set in the FDF system. The diagnostic set address is decoded at the interface into separate diagnostic set select signals, of which only one signal is asserted at a time. To disable the diagnostic isolation for normal searching, an invalid address is loaded in the diagnostic set address register.

It will be appreciated from the foregoing that the present invention represents a significant advance in the field of special search processors. In particular, the use of tolerance values to represent a degree of matching provides a useful improvement over a simple binary match result. Furthermore, the use of multiple match lines for storing and manipulating match results provides a variety of search possiblities, all of which are performed in a concurrent or systolic manner. It will also be appreciated that, although a specific embodiment of the invention has been described in detail for purposes of illustration, various modifications may be made without departing from the spirit and scope of the invention. Accordingly, the invention is not to be limited except as by the following claims.

We claim:

1. A special-purpose search processor, comprising:
   a plurality of serially-connected cells, each cell including
   a pattern register for storing part of a search pattern to be searched for,
   a character register for storing a character of a data stream to be searched, the character register of each cell being serially connected with character registers of other cells to form a character line,
   comparator means, connected to the pattern register and the character register, for comparing the contents of the pattern register and the character register, and
   a first match register for storing a quantity indicative of a match between the search pattern and the data stream, the first match register of each cell being serially connected with first match registers of other cells to form a first match line;
   means for initializing the cells to contain the search pattern;
   clock means for gating the data stream from cell to cell in the character line;
   means for inputting a tolerance value into the first match line, to indicate a degree of mismatch that will be tolerated;
   match logic means in each cell, including means for generating a match signal upon detection of a match between selected bits of the pattern register and the character register, and means for decrementing the tolerance value carried on the first match line if there is no detected match;
   at least one additional match register in each cell, serially connected with additional match registers of other cells to form at least one additinal match line; and
   means within each cell for controlling movement of tolerance values between match lines to effect a selected one of a variety of search functions.

2. A special-purpose search processor as defined in claim 1, in which:
   each cell also includes a flag register for storing the status of each of a plurality of control flags; and
   the match logic means in each cell includes means responsive to the states of the flags, for controlling the flow of match information through the cell.

3. A special-purpose search processor as defined in claim 2, in which:
   the match logic includes means responsive to one of the control flags to effect copying of match information on the first match line to a second match line, along which the information is propagated in synchronism with characters on the character line.

4. A special-purpose search processor as defined in claim 3, in which:
   the match logic includes means responsive to one of the control flags, to effect transfer of match information from the second match line back to the first match line, and simultaneously to effect transfer of information from the first match line to a third match line.

5. A special-purpose search processor as defined in claim 4, in which:
   the match logic includes means responsive to one of the control flags to effect a selection of the larger of the values carried on two of the match lines.

6. A special-purpose search processor as defined in claim 2, in which:
   the match logic includes means responsive to one of the control flags, designated a "last" flag, to effect a transfer of information from the first match line to an additional match line serving as a result line.

7. A special-purpose search processor as defined in claim 2, in which:
   each cell also includes a counter, and a length register that may be initialized to a selected count; and
   the match logic in each cell also includes means responsive to one of the control flags, to load the counter with the value stored in the length register and to decrement the counter upon detection of selected conditions in the match logic.

8. A special-purpose search processor as defined in claim 7, in which:
   the counter is employed to store a maximum character count for use in a variable-length "don't-care" search operation.

9. A special-purpose search processor as defined in claim 7, in which:
   the counter is employed to store a maximum character count for use in a variable-length "care" search operation.

10. A special-purpose search processor, comprising:
    a plurality of serially-connected cells, each cell including
    a pattern register for storing part of a search pattern to be searched for,
    a character register for temporarily storing a character of a data stream to be searched, the character register of each cell being serially connected with character registers of other cells to form a character line,
    a comparator, connected to the pattern register and the character register, for comparing the contents of the pattern register and the character register,
    a first match register for storing a quantity indicative of a match between the search pattern and the data stream,
    a delay register connected to receive output from the first match register of the cell, a combination of the first match register and the delay register being denoted a match/delay register pair, and the match/delay register pair of each cell being serially connected with other match/delay register pairs to form a first match line,
    a second match register, serially connected with second match registers of other cells to form a second match line, and
    a flag register for storing a plurality of control flags;
    means for initializing the cells to contain the search pattern;
    clock means for gating the data stream from cell to cell in the character line;

means for inputting a tolerance value into the first match line, to indicate a degree of mismatch that will be tolerated; and match logic in each cell, including means for generating a match signal upon detection of a match between the pattern register and the character register, and means for decrementing the tolerance value carried on the first match line if there is not detected match;

and in which the match logic also includes means responsive to a first control flag, for copying a tolerance value carried on the first match line onto the second match line.

11. A special-purpose search processor as defined in claim 10, in which:

each cell also includes a third match register, the third match register of each cell being serially connected with third registers of other cells to form a third match line; and the match logic also includes means responsive to a second control flag, for transferring a tolerance value carried on the first match line to the third match line, and simultaneously transferring a tolerance value carried on the second match line back to the first match line.

12. A special-purpose search processor as defined in claim 11, in which:

each cell also includes a fourth match register, the fourth match register of each cell being serially connected with fourth match registers of other cells to form a fourth match line; and the match logic also includes means responsive to a third control flag, for transferring a tolerance value carried on the first match line to the fourth match line, for output from the search processor.

13. A special-purpose search processor as defined in claim 12, in which:

the match logic also includes means responsive to a fourth flag, for selecting the greater of tolerance values carried on the first match line and the third match line.

14. A special-purpose search processor as defined in claim 13, in which:

each cell further includes a counter; and the match logic further includes means responsive to a fifth flag for transferring a tolerance value carried on the second match line to the first match line and means for recirculating the value carried on the second match line, up to a maximum number of times as determined by a count stored in the counter.

15. A special-purpose search processor as defined in claim 10, in which:

the match logic further includes means responsive to a bypass flag, for selectively bypassing the delay register and providing a propagation of values along the first match line at a rate synchronized with the rate of propagation of data along the character line.

16. A special-purpose search processor, comprising: a plurality of serially-connected cells, each cell including a pattern register for storing part of a search pattern to be searched for, a character register for storing a character of a data stream to be searched, the character register of each cell being serially connected with character registers of other cells to form a character line, comparator means, for comparing the contents of the pattern register and the character register, and a first match register for storing a match indicator indicative of a match between the search pattern and the data stream, the first match register of each cell being serially connected with first match registers of other cells to form a first match line;

means for initializing the cells to contain the search pattern;

clock means for gating the data steam from cell to cell in the character line;

means for inputting a match indicator into the first match line;

match logic means in each cell, including means for generating a match signal upon detection of a match between selected bits of the pattern register and the character register, and means for clearing the match indicator carried on the first match line if there is not detected match;

at least one additional match register in each cell, serially connected with additional match registers of other cells to form at least one additional match line; and means within each cell for controlling movement of match values between match lines to effect a selected one of a variety of search functions.

17. A special-purpose search processor as defined in claim 16, in which:

each cell also includes a flag register for storing a plurality of control flags; and the match logic means in each cell includes means responsive to the flags, for controlling flow of match information through the cell.

18. A special-purpose search processor as defined in claim 17, in which:

the match logic includes means responsive to one of the control flags to effect copying of match information on the first match line to a second match line, along which the information is propagated in synchronism with characters on the character line.

19. A special-purpose search processor as defined in claim 18, in which:

the match logic includes means responsive to one of the control flags, to effect transfer of match information from the second match line back to the first match line, and simultaneously to effect transfer of information from the first match line to a third match line.

20. A special-purpose search processor as defined in claim 17, in which:

the match logic includes means responsive to one of the control flags, designated a "last" flag, to effect transfer of information from the first match line to an additional match line serving as a result line.

21. A special-purpose search processor as defined in claim 17, in which:

each cell also includes a counter, and a length register that may be initialized to a selected count; and the match logic in each cell also includes means responsive to one of the control flags, to load the counter with a value stored in the length register and to decrement the counter upon detection of selected conditions in the match logic.

22. A special-purpose search processor as defined in claim 21, in which:

the counter is employed to store a maximum character count for use in a variable-length "don't-care" search operation.

23. A special-purpose search processor as defined in claim 21, in which:

the counter is employed to store a maximum character count for use in a variable-length "care" search operation.

24. A special-purpose search processor, comprising:
a plurality of serially-connected cells, each cell including
- a pattern register for storing part of a search pattern to be searched for,
- a character register for storing a character of a data stream to be searched, the character register of each cell being serially connected with character registers of other cells to form a character line,
- comparator means, for comparing the contents of the pattern register and the character register, and
- a first match register for storing tolerance values indicative of a degree of match between the search pattern and the data stream, the first match register of each cell being serially connected with first match registers of other cells to form a first match line;

means for initializing the cells to contain the search pattern;

clock means for gating the data stream from cell to cell in the character line;

means for inputting an initial tolerance value into the first match line, to indicate a degree of mismatch that will be tolerated;

match logic means in each cell, including means for generating a match signal upon detection of a match between pattern and character registers, and means for decrementing the tolerance value carried on the first match line if there is not detected match, whereby the initial tolerance value will be decremented to zero if there is sufficient mismatch between the search pattern and the data stream being searched.

25. A special-purpose search processor, comprising:
a plurality of serially-connected cells, each cell including
- a pattern register for storing part of a search pattern to be searched for,
- a character register for temporarily storing a character of a data stream to be searched, the character register of each cell being serially connected with character registers of other cells to form a character line,
- a comparator, connected to the pattern register and the character register, for comparing the contents of the pattern register and the character register,
- a first match register for storing a quantity indicative of a degree of match between the search pattern and the data stream, and
- a delay register connected to receive output from the first match register of the cell, a combination of the first match register and the delay register being denoted a match/delay register pair, and match/delay register pair of each cell being serially connected with other match/delay register pairs to form a first match line, means for initializing the cells to contain the search pattern;

clock means for gating the data stream from cell to cell in the character line;

means for inputting an initial tolerance value into the first match line, to indicate a degree of mismatch that will be tolerated; and match logic in each cell, including means for generating a match signal upon detection of a match between the pattern register and the character register, and means for decrementing the tolerance value carried on the first match line if there is not detected match, whereby the initial tolerance value will be decremented to zero if there is sufficient mismatch between the search pattern and the data stream being searched.

26. A method for performing a search of a serial data stream, using a serially connected group of comparison cells in a special-purpose search processor, the method comprising the steps of:

initializing each cell to contain a pattern character in a pattern register, and various control flags in a flag register, such that the comparison cells define at least one search pattern string;

applying the data stream as an input to a character register of a first cell in the serially connected group of comparison cells;

applying clocking signals to the cells, to cause propagation of the data stream along a character line formed by the character registers;

at each clocking signal in a first cell of a search pattern string, loading a match register with a preselected tolerance value;

at each clocking signal, transferring the contents of the match register in each cell into a delay register in each cell, and simultaneously transferring the contents of the delay register of an adjacent cell into the match register of this cell, whereby the match registers and delay registers of the serially connected group of comparison cells form a first match line for the transfer of a tolerance value from cell to cell;

at each clocking signal, comparing the contents of the character register and the pattern register in each cell;

if there is not match detected in the comparing step, decrementing the value transferred from the match register to the delay register, and in a cell having a first flag set, transferring the tolerance value carried on the first match line to a second match line, for later use in performing the search.

27. A method as defined in claim 26, and further including the steps of:

in a cell having a second flag set, transferring the tolerance value carried on the second match line back to the first match line, and simultaneously transferring the tolerance value carried on the first match line into a third match line.

28. A method as set forth in claim 27, and further comprising the step of:

in a cell having a third flag set, selecting for propagation along the first match line the larger of the tolerance values carried on the first match line and one of the second and third match lines.

29. A method as defined in claim 27, and further including the step of:

in a cell with a designated flag set, transferring the tolerance value carried on the second match line back onto the first match line.

30. A method as defined in claim 26, for performing a logical OR search for a plurality of pattern strings, each of which has a first character, a last character and other characters, in which:

the first character of each pattern string contains a flag to load a desired tolerance value into the match register;

the last character of each pattern string contains a flag to transfer the tolerance value on the first match line to the second match line; and the method includes a final step of outputting tolerance values indicative of a degree of match between the data stream being searched and either of the pattern strings.

31. A method as set forth in claim 26, for performing a negate search function whereby a match is to be indicated only if the data stream does not contain a pattern string, in which: the initializing step includes initializing a first pattern string for which a match is required, initializing an intermediate cell to contain a flag to effect copying of the tolerance value from the first match line to a second match line, initializing a second pattern string to contain the string not required in the search, and initializing a second intermediate cell after the second string, to contain a negate flag; and the method further includes the steps of detecting a match for the first pattern string and transferring a corresponding tolerance value to the second match line, and in the cell with the negate flag set, recirculating the tolerance value carried on the second match line and transferring the recirculated tolerance value back to the first match line, unless a match indication is obtained for the second pattern string, in which case a zero tolerance value is transferred to the first match line, to indicate that the second pattern string was present and no overall match is possible.

32. A method as defined in claim 26, for performing a common-prefix logical OR search, in which:

the initializing step includes initializing a first pattern string to contain a common prefix for which a match is required, initializing an intermediate cell to contain a flat to effect copying of the tolerance value from the first match line to a second match line, initializing a second pattern string to contain one alternative pattern to follow the common prefix, initializing a third pattern string to contain another alternative to follow the common prefix, initializing a first cell of the third pattern string and any subsequent alternative pattern strings to contain an OR flag, initializing a last cell of the third string and any subsequent alternative strings to contain a choose flag, and initializing a last cell in a last of the alternative string to contain a last flag;

and the method further includes the steps of searching for a match in the first pattern string and transferring it to the second match line, searching for a match in the second pattern string, as a result of the OR flag, transferring the result of the second pattern string match to the first match line, while simultaneously copying the tolerance value carried on the first match line into a third match line, as a result of the choose flag, selecting from the tolerance values carried on the first match line and the third match line, and as a result of the last flag, transferring a final tolerance result onto a fourth match line for output from the processor.

33. A method as defined in claim 26, for performing a variable-length don't-care search, in which:

the initializing step includes initializing a first pattern string to be matched, initializing an intermediate cell with a maximum character count in its counter, and initializing a second pattern string following the intermediate cell; and the method further includes the steps of searching for a match of the first pattern string, in the intermediate cell, recirculating the tolerance value on the first match line, up to n times, where n is a maximum number of characters permitted between the first pattern string and the second pattern string, and comparing subsequent strings of data in the data stream with the second pattern string.

34. A method as defined in claim 26, for performing a variable-length-care search function for locating two pattern strings separated by any combination of up to n permissible characters, in which:

the initializing step includes initializing a first pattern string to be identified in the data stream, initializing a second pattern string to be identified in the data stream, and initializing an intermediate group of cells between the first pattern string and the second pattern string, including a first cell containing a flag to effect copying of the first match line to a second match line, a plurality of cells each containing permissible characters, which may appear between the first pattern string and the second pattern string up to n times, and a cell containing a "right" flag, to effect transfer of a match indicator from the second match line to the first match line; and the method further includes the steps of comparing the data stream with the first pattern string, transferring any match value to the second match line, comparing each subsequent character in the data stream with each of the permissible characters, decrementing the match indicator saved on the second match line if there is no match with the permissible characters, and transferring the match indicator saved on the second match line back to he first match line up to n times, where n is a preselected total number of times that the permissible characters may appear in any combination.

35. A method for searching a data stream in a fully concurrent searching mode in a specialpurpose search processor, the method comprising the steps of:

initializing a group of serially connected cells to contain a search pattern and selected control flags for directing a search;

passing the data stream through the group of cells;

comparing, in each cell, a data stream character with a pattern character stored in the cell;

transmitting a match tolerance value into a match line connecting the cells;

decrementing the match tolerance value in each cell in which there is not match;

transmitting the match tolerance value to an adjacent cell in the group of serially connected cells;

temporarily storing match tolerance values on at least one additional match line; and retrieving the values temporarily stored in the last-recited step, to effect logically complex searched of the data stream.

36. A method as defined in claim 35, in which:

the step of retrieving includes the steps of selecting the larger of two match tolerance values on two separate match lines.

37. A method as defined in claim 35, in which the step of retrieving includes the steps of:

transferring a match tolerance value from a first match line to another match line; and simultaneously transferring a match tolerance value from a third match line to the first match line.

38. A method as defined in claim 35, and further including the steps of:

initializing a counter with a maximum character count; and employing the character count to detect character strings in the search pattern.

39. A method for performing a search of a serial data stream, using a serially connected group of comparison cells in a special-purpose search processor, the method comprising the steps of:

initializing each cell to contain a pattern character in a pattern register, and various control flags in a flag register, such that the comparison cells define at least one pattern string;

applying the data stream as an input to a character register of a first cell in the serially connected group of comparison cells;

applying clocking signals to the cells, to cause propagation of the data stream along a character line formed by the character registers;

at each clocking signal in a first cell of a pattern string, loading a match register with a match indicator;

at each clocking signal, transferring the contents of the match register in each cell into a delay register in each cell, and simultaneously transferring the contents of the delay register of an adjacent cell into the match register of this cell, whereby the match registers and the delay registers of the serially connected group of comparison cells form a first match line for the transfer of a match indicator from cell to cell;

at each clocking signal, comparing the contents of the character register and the pattern register in each cell;

if there is no match detected in the com- paring step, clearing to the match indicator transferred from the match register to the delay register; and in a cell having a first flag set, transferring the match indicator carried on the match line to a second match line, for later use in performing the search.

40. A method as defined in claim 39, and further including the steps of:

in a cell having a second flag set, transferring the match indicator carried on the second match line back to the first match line, and simultaneously transferring the match indicator carried on the first match line onto a third match line.

41. A method as defined in claim 40, and further including the step of:

in a cell with a designated flag set, transferring the match indicator carried on the second match line back onto the first match line.

42. A method as defined in claim 39, for performing a logical OR search for a plurality of pattern string, in which:

a first character of each pattern string contains a flag to load a match indicator into the match register;

a last character of each pattern string contains a flag to transfer the match indicator on the first match line to the second match line; and the method includes a final step of outputting match indicators indicative a match between the data stream being searched and either of the pattern strings.

43. A method as set forth in claim 39, for performing a negate search function whereby a match is to be indicated only if the data stream does not contain a pattern string, in which:

the initializing step includes initializing a first pattern string for which a match is required, initializing an intermediate cell to contain a flag to effect copying of the match indicator from the first match line to a second match line, initializing a second pattern string to contain the string not required in the search, and initializing a second intermediate cell after the second string, to contain a negate flag; and the method further includes the steps of detecting a match for the first pattern string and transferring a corresponding match indicator to the second match line, and in the cell with the negate flag set, recirculating the match indicator carried on the second match line and transferring the match indicator recirculated in this method step back to the first match line, unless a match indication is obtained for the second pattern string, in which case a cleared tolerance indicator is transferred to the first match line, to indicate that the second pattern string was present and no overall match is possible.

44. A method as defined in claim 39, for use in performing a common-prefix logical OR search, in which:

the initializing step includes initializing a first pattern string to contain a common prefix for which a match is required, initializing an intermediate cell to contain a flag to effect copying of the match indicator from the first match line to a second match line, initializing a second pattern string to contain one alternative pattern to follow the common prefix, initializing third pattern string to contain another alternative to follow the common prefix, initializing a first cell of the third pattern string and any subsequent alternative pattern strings to contain an OR flag, initializing a last cell of the third string and any subsequent alternative strings to contain a choose flag, and initializing a last cell in a last of the alternative strings to contain last flag;

and the method further includes the steps of searching for a match in the first pattern string and transferring it to the second match line, searching for a match in the second pattern string, as a result of the OR flag, transferring the result of the second pattern string match to the first match line, while simultaneously copying the match indicator carried on the first match line into a third match line, as a result of the choose flag, selecting from match indicators carried on the first match line and the third match line, and as a result of the last flag, transferring a final match result onto a fourth match line for output from the processor.

45. A method as defined in claim 39, for performing a variable-length don't-care search, in which:

the initiating step includes
initializing a first pattern string to be matched,
initializing an intermediate cell with a maximum character count in its counter, and
initializing a second pattern string following the intermediate cell; and the method further includes the steps of
searching for a match of the first pattern string,
in the intermediate cell, recirculating the match indicator on the first match line, up to n times, where n is a maximum number of characters permitted between the first pattern string and the second pattern string, and
comparing subsequent strings of data in the data stream with the second pattern string.

46. A method as defined in claim 39, for performing a variable-length-care search function for locating two pattern strings separated by any combination of up to n permissible characters, in which:

the initializing step includes
initializing a first pattern string to be identified in the data stream,
initializing a second pattern string to be identified in the data stream, and
initializing an intermediate group of cells between the the first pattern string and the second pattern string, including a first cell containing a flag to effect copying of the first match line to a second match line, a plurality of cells each containing permissible characters, which may appear between the first pattern string and the second pattern string up to n times, and a cell containing a "right" flag, to effect transfer of a match indicator from the second match line to the first match line; and the method further includes the steps of
comparing the data stream with the first pattern string,
transferring any match indicator to the second match line,
comparing each subsequent character in the data stream with each of the permissible characters,
clearing the match indicator saved on the second match line if there is no match with the permissible characters, and
transferring the match indicator saved on the second match line back to the first match line up to n times, where n is a preselected total number of times that the permissible characters may appear in any combination.

47. A method for searching a data stream in a fully concurrent searching mode in a special-purpose search processor, the method comprising the steps of:

initializing a group of serially connected cells to contain a search pattern and selected control flags for directing a search;

passing the data stream through the group of cells;

comparing, in each cell, a data stream character with a pattern character stored in the cell;

transmitting a match indicator into a match line connecting the cells;

clearing the match indicator in each cell in which there is no match;

transmitting the match indicator to an adjacent cell in the group of serially connected cells;

temporarily storing match indicators on at least one additional match line; and retrieving the match indicators temporarily stored in the last-recited method step, to effect logically complex searches of the data stream.

48. A method as defined in claim 47, in which the step of retrieving includes the steps of:

transferring a indicator from a first match line to another match line; and simultaneously transferring a match indicator from a third match line to the first match line.

49. A method as defined in claim 47, and further including the steps of:

initializing a counter with a maximum character count; and employing the character count to detect character strings in the search pattern.

50. A method for performing a search of a serial data stream, using a serially connected group of comparison cells in a special-purpose search processor, the method comprising the steps of:

initializing each cell to contain a pattern character in a pattern register, such that the comparison cells define at least one pattern string;

applying the data stream as an input to a character register of a first cell in the serially connected group of comparison cells;

applying clocking signals to the cells, to cause propagation of the data stream along a character line formed by serial connection of the character registers of the group of cells;

at each clocking signal in a first cell of a pattern string, loading a match register with a preselected tolerance value;

at each clocking signal, transferring the contents of the match register in each cell into a delay register in each cell, and simultaneously transferring the contents of the delay register of an adjacent cell into the match register of this cell;

at each clocking signal, comparing the contents of the character register and the pattern register in each cell; and if there is no match detected in the comparing step, decrementing a value transferred from the match register to the delay register.

51. A method for searching a data stream in a fully concurrent searching mode in a special-purpose search processor, the method comprising the steps of:

initializing a group of serially connected cells to contain a search pattern;

passing the data stream through the group of cells;

comparing, in each cell, a data stream character with a pattern character stored in the cell;

transmitting a match tolerance value into a match line connecting the cells;

decrementing the match tolerance value in each cell in which there is no match;

transmitting the match tolerance value to an adjacent cell in the serially connected group of comparison cells; and outputting from a last sequential cell in the search pattern a match tolerance value indicating to what extent there is a match between the pattern and the data stream.

52. A method for searching a stream of text for specified search patterns, comprising the steps of:

storing a search pattern in a serially connected plurality of comparison cells;

passing a test stream through the comparison cells;

detecting exact matches between the text stream and the search pattern;

selectively detecting inexact matches between the text stream and the search pattern, including, to a limited and preselected extent, the presence of incorrect and extra characters in the text stream and the absence of characters from the text stream; and generating match signals indicative of the exact and inexact matches, for output from the serially connected cells in synchronism with the text stream;

wherein the step of generating match signals includes introducing a match tolerance value into a first of a string of cells defining a search pattern, passing the match tolerance value from cell to cell, and adjusting the match tolerance value in accordance with the detection of a match or non-match at each cell, whereby the adjusted match tolerance value is a match signal indicative of exact and inexact matches between the text stream and the search pattern.

53. A special-purpose search processor for searching a stream of text for specified search patterns, the processor comprising:

means for storing a search pattern in a serially connected plurality of comparison cells;

means for passing the text stream through the comparison cells;

means for detecting exact matches between the text stream and the search pattern;

means for selectively detecting inexact matches between the test stream and the search pattern; and means for generating match signals indicative of exact and inexact matches, for outputs from the serially connected cells in synchronism with the text stream;

wherein the means for selectively detecting exact and inexact matches includes means for introducing a match tolerance value into a first of a string of cells defining a search pattern, means for passing the match tolerance value from cell to cell, and means for adjusting the match tolerance value in accordance with the detection of a match or non-match at each cell, whereby the adjusted match tolerance value is a match signal indicative of exact and inexact matches between the text stream and the search pattern.

* * * * *